United States Patent [19]
Roper et al.

[11] Patent Number: 5,890,387
[45] Date of Patent: *Apr. 6, 1999

[54] APPARATUS AND METHOD FOR FORMING AND HYDROPIERCING A TUBULAR FRAME MEMBER

[75] Inventors: Ralph E. Roper, Indianapolis, Ind.; Gary Alan Webb, West Bloomfield, Mich.; Douglas W. Tyger, West Chester, Ohio

[73] Assignee: Aquaform Inc., Auburn Hills, Mich.

[ * ] Notice: The terminal 51 months of this patent has been disclaimed.

[21] Appl. No.: 945,322

[22] Filed: Sep. 15, 1992

Related U.S. Application Data

[63] Continuation-in-part of Ser. No. 837,081, Feb. 13, 1992, Pat. No. 5,239,852, which is a continuation of Ser. No. 482,782, Feb. 21, 1990, abandoned, which is a continuation-in-part of Ser. No. 398,272, Aug. 24, 1989, abandoned.

[51] Int. Cl.$^6$ .................................................. B21D 26/02
[52] U.S. Cl. .............................................. 72/58; 29/421.1
[58] Field of Search .................................. 72/57, 58, 56, 72/59, 61, 62, 55; 29/421.1

[56] References Cited

U.S. PATENT DOCUMENTS

| | | |
|---|---|---|
| 203,842 | 5/1878 | Leland . |
| 693,172 | 2/1902 | Sneddon . |
| 1,542,983 | 6/1925 | Bergmann, Jr. . |
| 1,943,560 | 1/1934 | Squires . |
| 2,047,296 | 7/1936 | Squires . |
| 2,777,500 | 1/1957 | Ekholm et al. . |
| 3,105,537 | 10/1963 | Foster . |
| 3,136,053 | 6/1964 | Powell . |
| 3,220,098 | 11/1965 | Arbogast . |
| 3,487,668 | 1/1970 | Fuchs, Jr. ..................................... 72/55 |
| 3,739,615 | 6/1973 | Tressel . |
| 3,810,302 | 5/1974 | Broers et al. . |
| 4,051,704 | 10/1977 | Kimura . |
| 4,238,878 | 12/1980 | Stamm et al. . |
| 4,319,471 | 3/1982 | Benteler et al. . |
| 4,454,745 | 6/1984 | Cudini . |
| 4,567,743 | 2/1986 | Cudini . |
| 4,662,204 | 5/1987 | Saegusa . |
| 4,704,886 | 11/1987 | Evert et al. . |
| 4,744,237 | 5/1988 | Cudini . |
| 4,759,111 | 7/1988 | Cudini . |
| 4,763,506 | 8/1988 | Zeng . |
| 4,766,756 | 8/1988 | Shiue . |
| 4,827,747 | 5/1989 | Okada et al. . |
| 4,829,803 | 5/1989 | Cudini . |
| 4,989,482 | 2/1991 | Mason . |
| 5,070,717 | 12/1991 | Boyd et al. ................................. 72/55 |

FOREIGN PATENT DOCUMENTS

| | | |
|---|---|---|
| 45-1344 | 1/1970 | Japan . |
| 55-77934 | 6/1980 | Japan . |
| 58-3738 | 3/1983 | Japan . |
| 59-130633 | 11/1984 | Japan . |
| 60-82229 | 5/1985 | Japan . |
| 549199 | 7/1977 | Russian Federation . |
| 385146 | 3/1965 | Switzerland . |
| 2162446 | 2/1986 | United Kingdom . |

*Primary Examiner*—David Jones
*Attorney, Agent, or Firm*—Arnold, White & Durkee

[57] ABSTRACT

A method and apparatus for forming complex shaped frame members from a tubular blank where the blank is transferred from station to station and various tooling are performed on the blank at each station. For example, at a first station the blank is expanded into a tube having a varying cross-section throughout the length of the tube by applying pressure to the interior of the tube and compressive force to the opposed ends of the tube preferably simultaneously. At another station, the expanded tube is preformed by introducing a bend therein. The bend in the preformed tube is then increased at another station. While the expanded tube is being preformed and bent, the flow of material into the die cavity at those stations is controlled to reduce the amount of folding that may occur. The shape of the frame member is finished at another station by introducing a lateral bend and varying the cross-sectional configuration of the bent tube. Holes may then be pierced into the finished frame member at another station by pressurizing the interior of the frame member with hydraulic fluid and striking the frame member with a piercing punch. Final stations crop the ends and flush the interior of the frame member before it is unloaded for further transport.

16 Claims, 16 Drawing Sheets

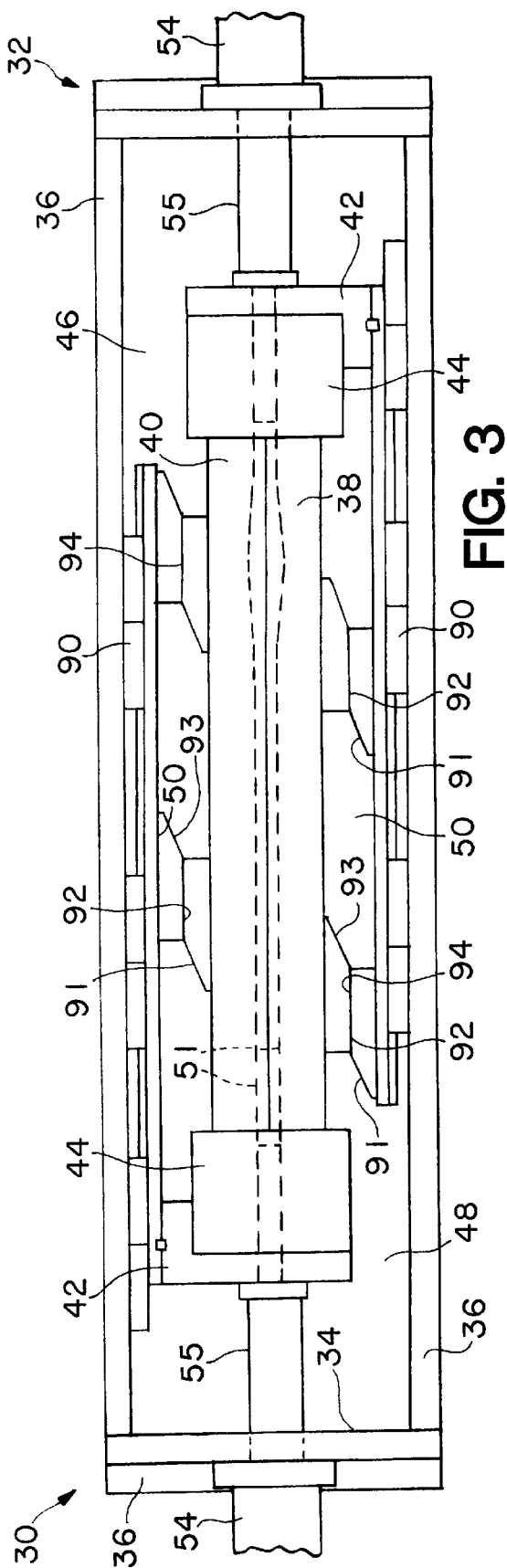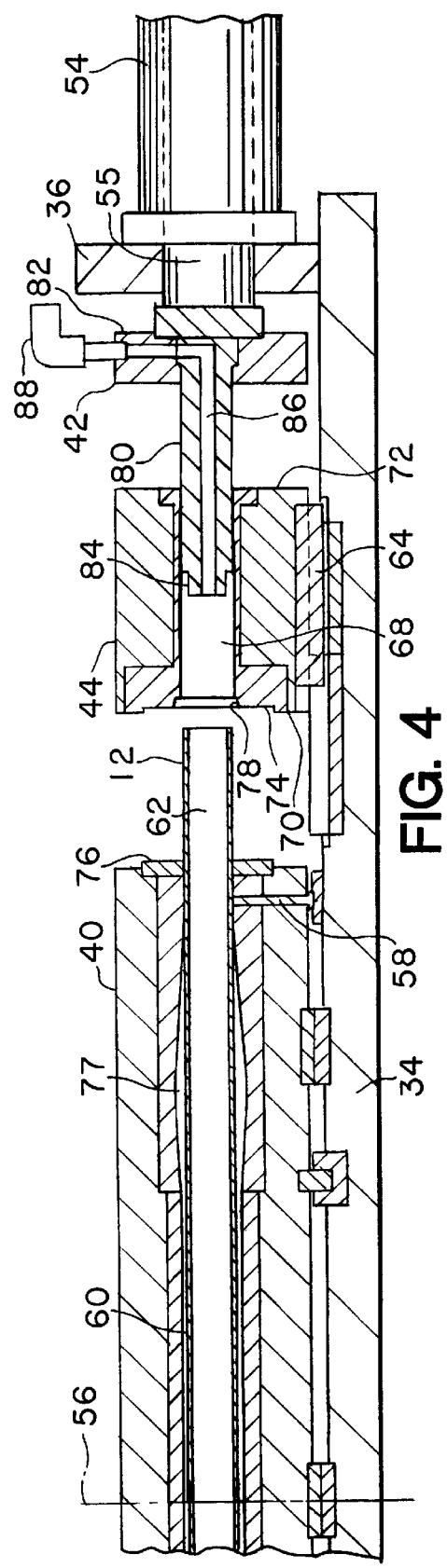
FIG. 3
FIG. 4

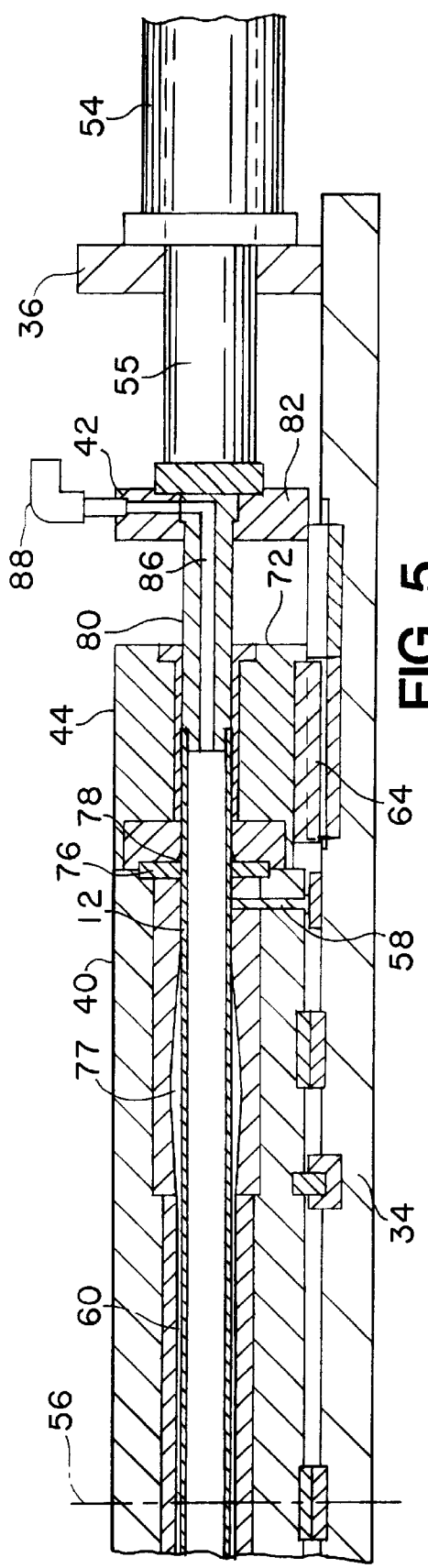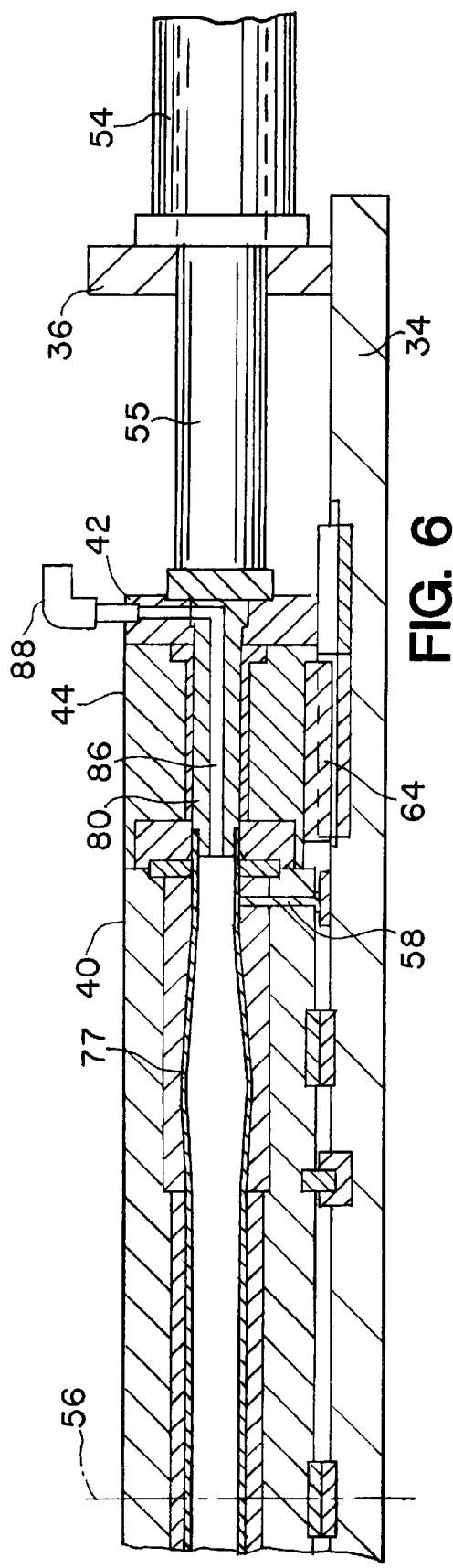

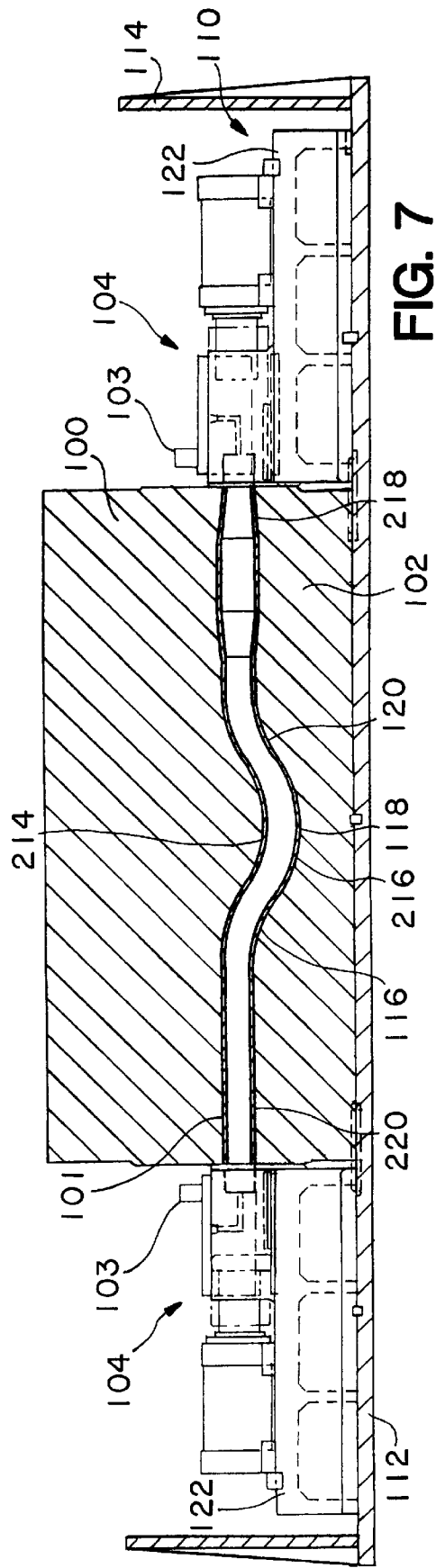

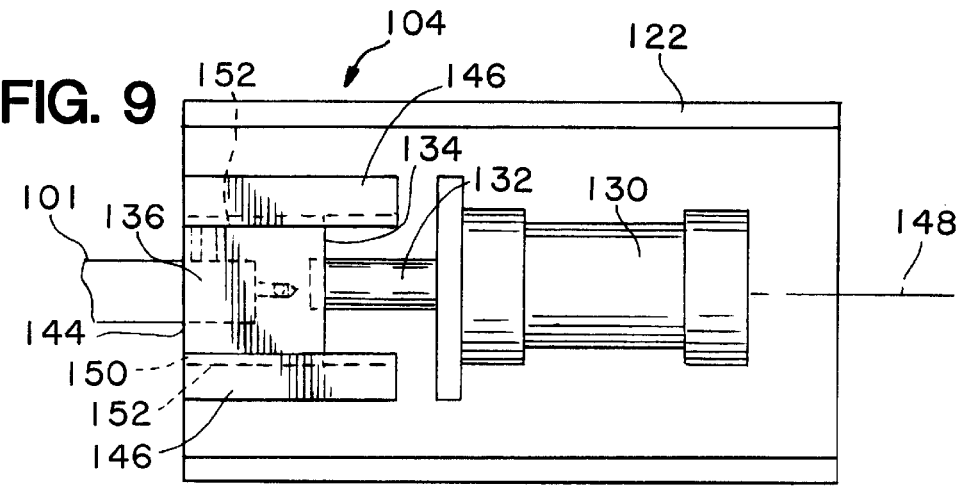
FIG. 9
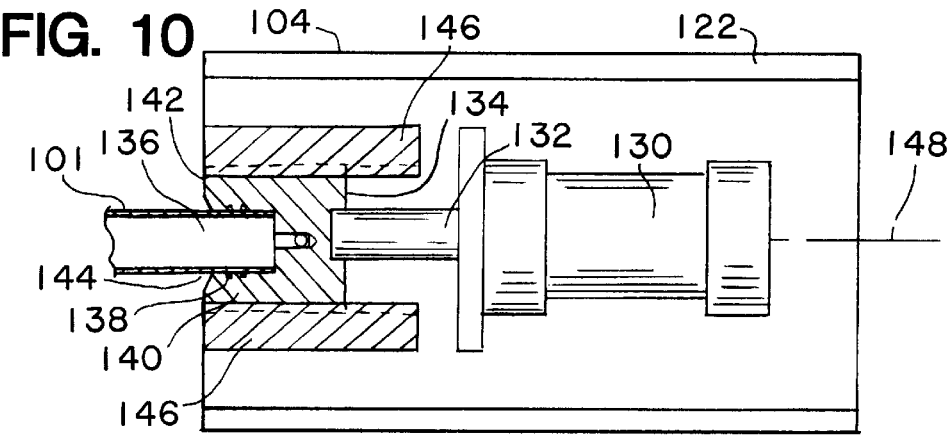
FIG. 10
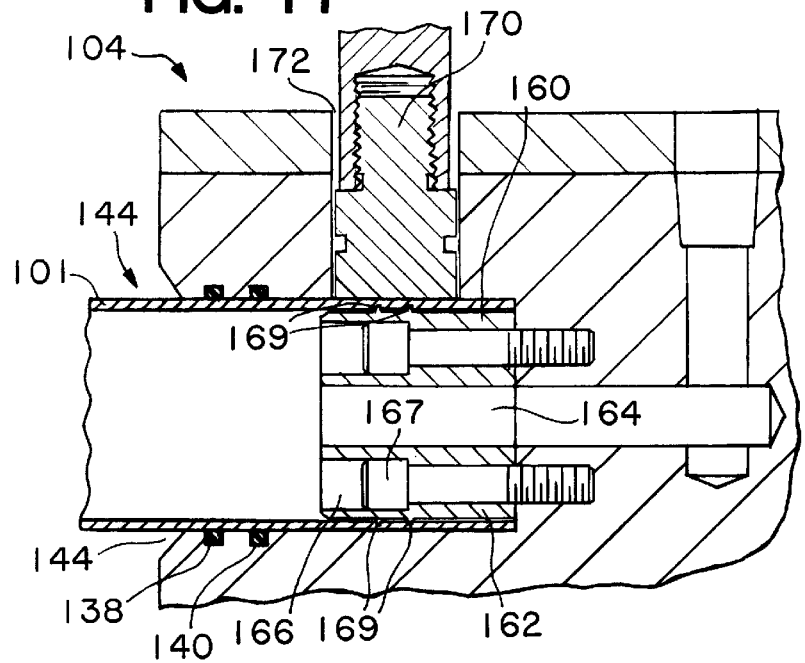
FIG. 11
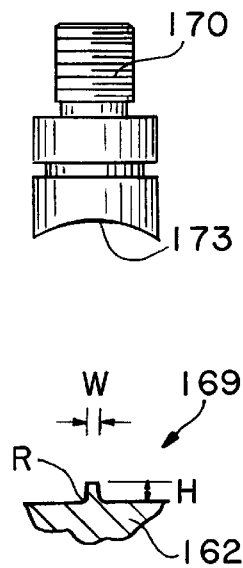
FIG. 12
FIG. 13

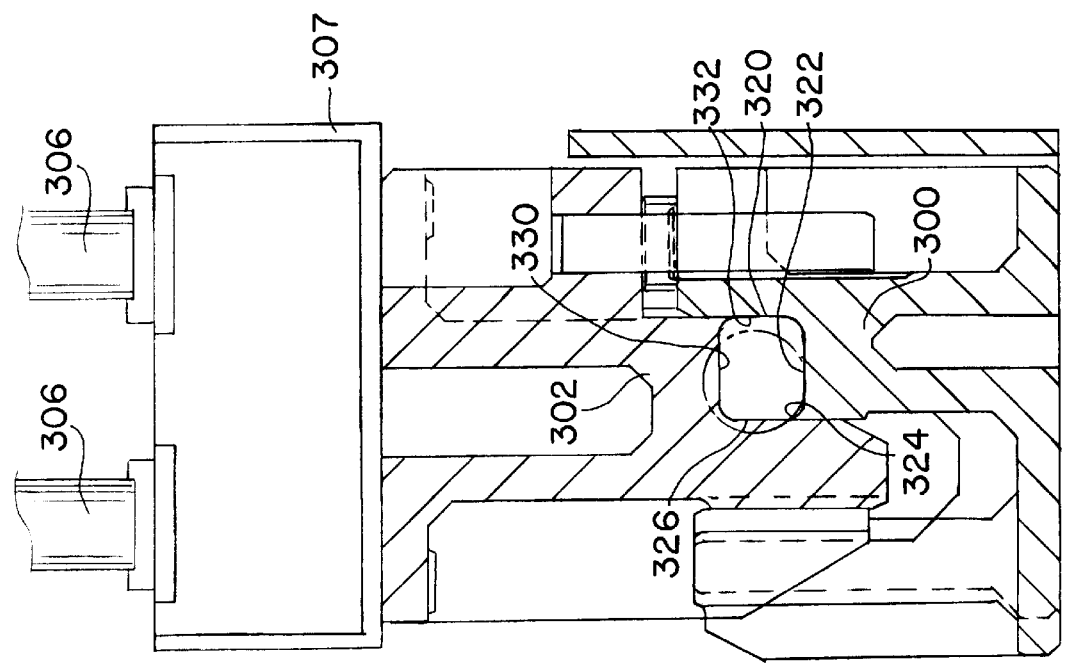
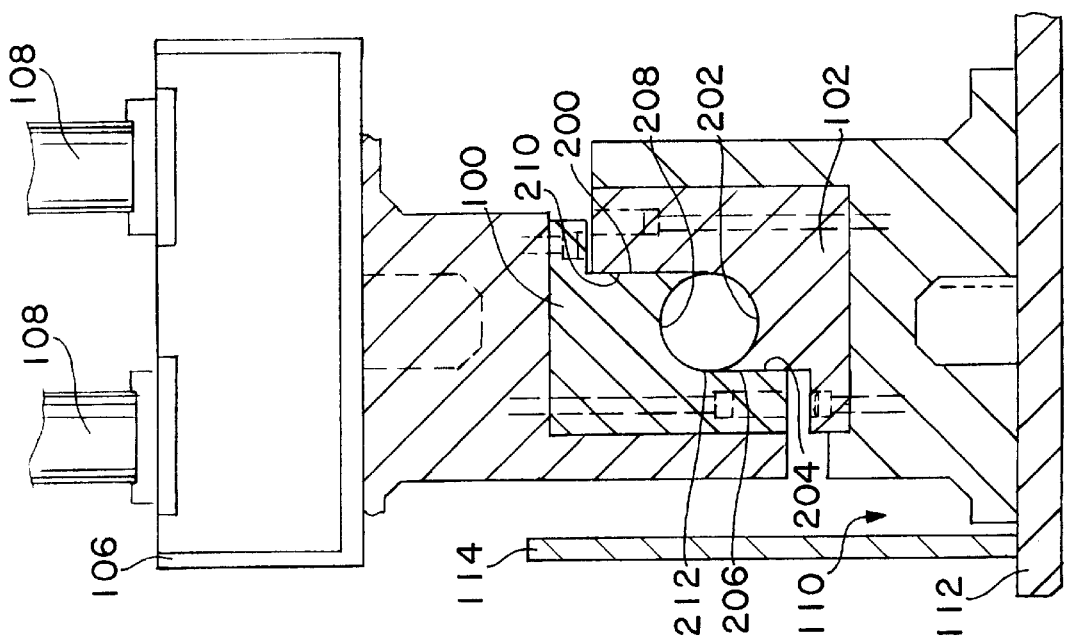

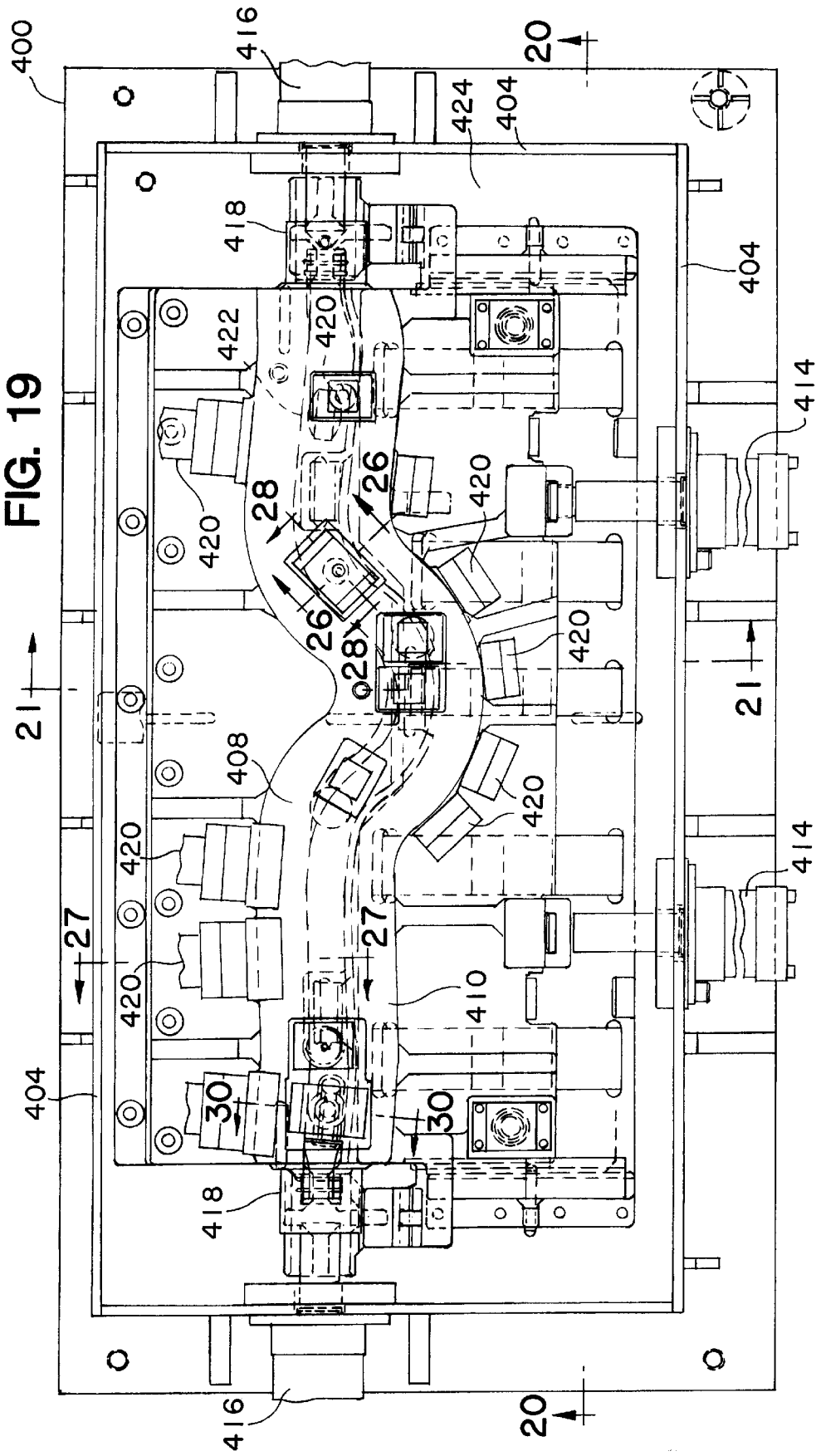

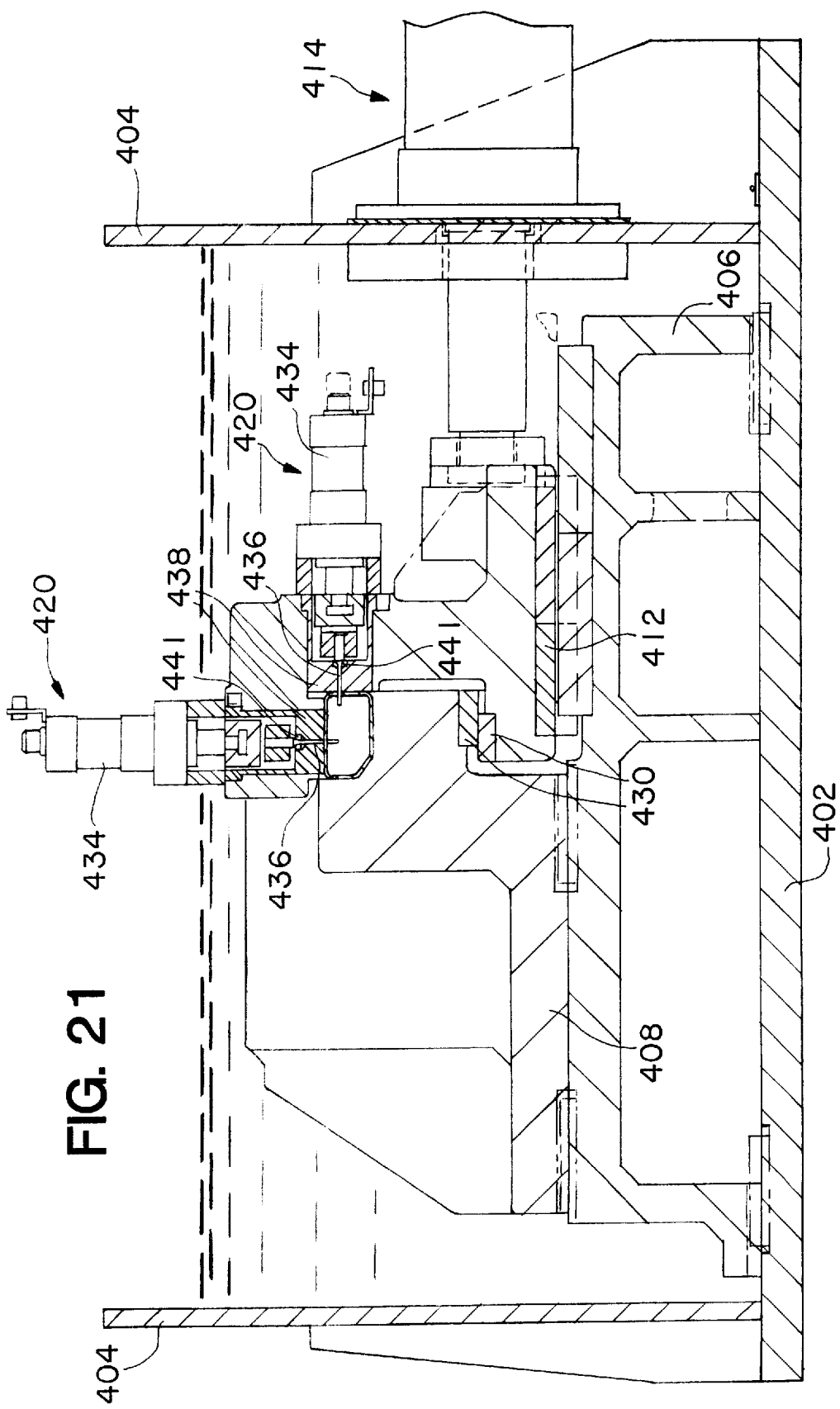

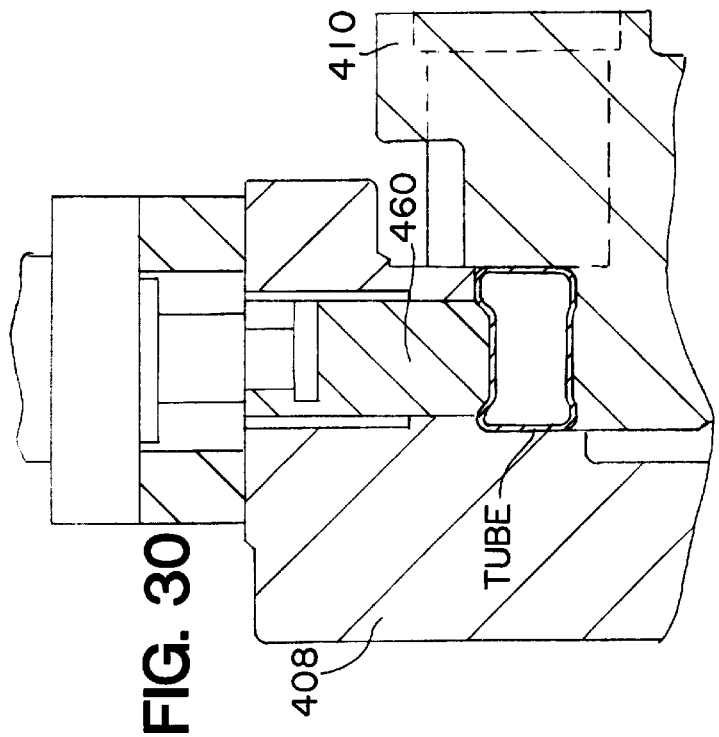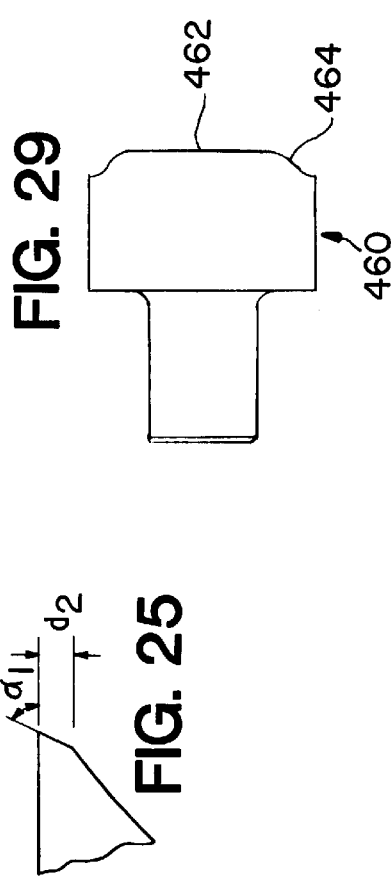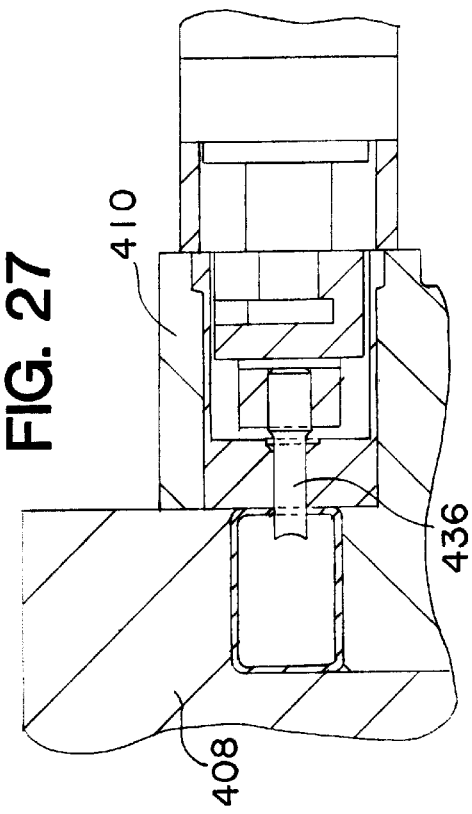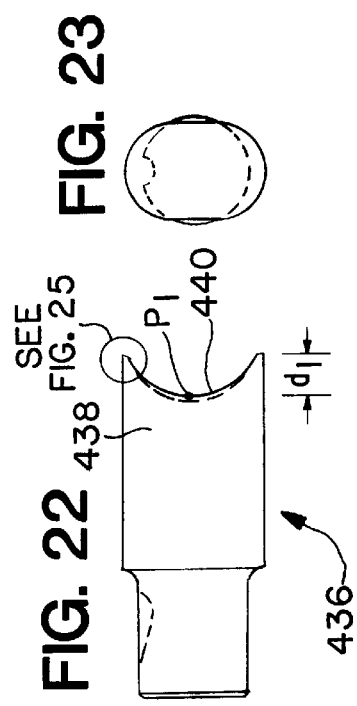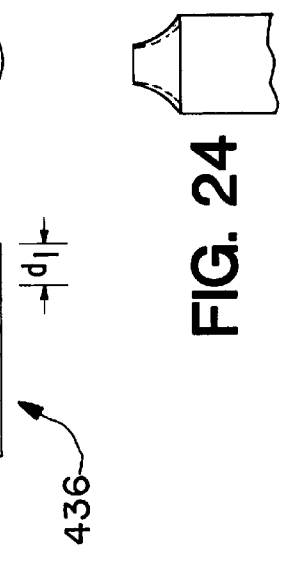

APPARATUS AND METHOD FOR FORMING AND HYDROPIERCING A TUBULAR FRAME MEMBER

This application is a continuation-in-part of U.S. patent application Ser. No. 07/837,081, filed Feb. 13, 1992, now U.S. Pat. No. 5,239,852 entitled "Apparatus and Method for Forming a Tubular Frame Member" by Ralph E. Roper (attorney docket no. 4397/20) which is a continuation of Ser. No. 07/482,782, filed Feb. 21, 1990 (attorney docket no. 4397/10), now abandoned, which is a continuation-in-part of Ser. No. 07/398,272, filed Aug. 24, 1989 (attorney docket no. 4397/8), now abandoned, all of which are herein incorporated by reference.

BACKGROUND OF THE INVENTION

1. Field of the Invention

The present invention relates to the field of cold forming tubular materials and in particular to an apparatus and method for forming and piercing a complex-shaped tubular frame member from a tubular blank.

2. Description of the Prior Art

The principal frame design for automobile frame members is of the "box" type construction for strength and load bearing purposes. These frame members often have great variation in both the horizontal and the vertical profile. The cross-section of such tube members also often varies rather extremely from approximately a square cross-section, to a rectangular cross-section to a round cross-section to a severely flattened cross-section, and to any irregularly shaped combination of the above. While some simple, large radiused profiles with varying cross-sections have been obtained by cold or heat forming a generally cylindrical tube blank, most current manufacturing methods produce the complex-shaped box section tube member by fabricating two "U" section stampings which are then welded together to form the finished part. Unfortunately, material and labor consumption in these processes is enormously inefficient.

The general operations of bending, stretching, depressing and radially expanding a tube blank, with or without a mandrel, are known. For the majority of metals, it is fairly easy to bend small diameter tubing into an arc having a large radius. But as the diameter of the tubing increases and the radius about which it is to be bent decreases, the tube bending process requires some combination of compression at the inner bending radius of the tube and stretching at the outer radius. Although the outer bending surface of the tube may be stretched to the full extent of the materials rated elongation characteristics, one cannot satisfactorily bend a tube with a given diameter about a relatively small bending radius without encountering severe buckling at the inner bending surface or undesirable deformation at the outer bending radius. Some have achieved bending tubes with a certain diameter about relatively small bending radii by controllably dimpling or allowing controlled rippling of the inner tube surface thereby creating less stretching of the outer tube surface.

Other examples of methods for bending a tube are disclosed in U.S. Pat. No. 4,704,886, which shows internally pressurizing a tube blank, gripping the opposite ends of the blank and applying longitudinal tension at the ends while applying a lateral force against the blank to bend the blank. U.S. Pat. No. 4,567,543, discloses depressing regions of the tube blank and then expanding the blank within a complementary shaped cavity formed by a pair of dies. U.S. Pat. No. 4,829,803 discloses forming a box-like frame member by internally-pressurizing a preformed tubular blank, closing a pair of die halves around the blank to partially deform the blank within mating die cavities, and then increasing the internal pressure to exceed the yield limit of the wall of the blank to expand the blank into conformity within the mating die cavities.

In addition, holes have to be cut or pierced into each box section tube member in order to join the members together to form a space frame for an automobile. To pierce or cut the holes into the tube member a solid mandrel, die block or die button is inserted into the interior of the tube and placed against the surface of the tube to be pierced. A punch then strikes the exterior surface of the tube to cut the hole. The mandrel, die block or die button is used to support the wall or surface of the tube as it is being pierced. If the wall or surface is not supported, a hole can not be neatly pierced in the tube. Instead the surface of the tube surrounding the hole has a tendency to become deformed. In order to place the mandrel, die block or die button against the interior surface of the tube, it is easier to pierce holes in the two "U" section stampings before assembling and welding the two sections together.

It is therefore desirable to provide an apparatus to form a tubular blank into a frame member having variations in the vertical and horizontal profiles and in the cross-sectional configuration while reducing the amount of variation in the wall thickness of the finished frame member.

It is also desirable to provide an apparatus for piercing and cutting holes in a finished frame member without the use of a solid mandrel, die block or die button to support the wall or surface of the tube.

SUMMARY OF THE INVENTION

A method and apparatus for forming complex shaped frame members from a tubular blank where the blank is transferred from station to station and various tooling are performed on the blank at each station. At a first station the blank is expanded into a tube having a varying cross-section throughout the length of the tube by placing the blank in a die cavity defining an expanded tube and applying pressure to the interior of the blank and compressive force to the opposed ends of the blank. The blank is allowed to expand into the die cavity and the compressive force applied to the ends of the tube allow material to flow into the die cavity thus reducing the likelihood that the blank will burst during the expansion step. At another station, the expanded tube is preformed by introducing a bend therein. The expanded tube is placed in a die cavity defining the preformed tube and the interior of the expanded tube is pressurized as the die cavity is closed around the expanded tube. The bend in the preformed tube is then increased at another station by placing the preformed tube in a die cavity defining a bent tube and pressurizing the interior of the preformed tube as the die cavity is closed. As the expanded tube is being preformed and bent in the above-described stations, the flow of material into the die cavity at those stations is controlled to reduce the amount of folding that may occur. The shape of the frame member is finished at another station by introducing a lateral bend and varying the cross-sectional configuration of the bent tube. The bent tube is placed in a die cavity and pressurized as the die cavity is closed. After the die cavity is closed, the pressure inside the tube is increased so that the cross-section of the tube is varied. Holes may then be pierced into the finished frame member at another station by pressurizing the interior of the frame member with hydraulic fluid and striking the frame member with a piercing punch.

The ends of the frame member are cropped and slugs are flushed from the interior of the frame member before it is unloaded.

It is an object of the present invention to provide an apparatus which will form complex-shaped frame members from tubular blanks. It is another object of the present invention to provide a tube forming apparatus producing frame members free of defects such as ruptures and folding.

It is another object of the present invention to quickly and economically produce shaped frame members from tubular blanks.

It is still another object of the present invention to provide an apparatus which controls the amount of material flow into a die cavity during tube formation steps.

It is yet another object of the present invention to provide an apparatus which neatly pierces holes into a finished frame member.

It is still another object of the present invention to form space frame members from steel tubular blanks.

It is still yet another object of the present invention to form tubular members having varying cross-sections along the length of the member.

Further objects and advantages of the present invention will become apparent from the following description of the preferred embodiments.

BRIEF DESCRIPTION OF THE DRAWINGS

FIG. 3 is a plan view of hydroforming Station II of FIG. 1 with the die halves, lock blocks and sealing units shown in their engaged position.

FIG. 4 is a side, cross-sectional view of one-half of hydroforming Station II of FIG. 3 with the lock block and sealing unit retracted from the die halves.

FIG. 5 is a side, cross-sectional view of one-half of hydroforming Station II of FIG. 3 with the lock block translated to its engaged position.

FIG. 6 is a side, cross-sectional view of one-half of hydroforming Station II of FIG. 3 with both the lock block and sealing unit translated to their engaged position.

FIG. 7 is a side, partial cross-sectional view of hydroforming Station III of FIG. 1 with the punch lowered upon the die and the sealing units engaged with the ends of the tube.

FIG. 9 is plan view of the sealing unit shown in FIG. 7.

FIG. 10 is cross-sectional view of the sealing unit shown in FIGS. 7 and 9.

FIG. 11 is a cross-sectional view of a gripper mounted in a sealing unit shown in FIGS. 9 and 10 according to a preferred embodiment of the present invention.

FIG. 12 illustrates a plunger used in conjunction with the gripper and sealing unit shown in FIG. 11.

FIG. 13 is a detailed view of the bead formed on the exterior of the gripper surface shown in FIG. 11.

FIG. 14 is a cross-sectional view of the hydroforming Station III.

FIG. 18 is a cross-sectional view of the hydroforming Station V.

FIG. 19 is a plan view of Station VI of FIG. 1 with the punch engaged with the post and the sealing units engaged with the ends of the tube.

FIG. 21 is a cross-sectional view of Station VI taken along lines 21—21 of FIG. 19.

FIG. 22 illustrates a piercing punch used in conjunction with a preferred embodiment of the present invention.

FIG. 23 illustrates the front view of the punch shown in FIG. 22.

FIG. 24 illustrates an opposite side view of the punch of FIG. 22.

FIG. 25 is an blow-up view of a portion of the punch shown in FIG. 22.

FIG. 27 is a cross-sectional view of Station VI taken along lines 27—27 of FIG. 19.

FIG. 29 illustrates a deformation punch according to another preferred embodiment of the present invention.

FIG. 30 is a cross-sectional view of Station VI taken along lines 30—30 of FIG. 19 using the deformation punch of FIG. 29.

DETAILED DESCRIPTION OF THE PRESENTLY PREFERRED EMBODIMENTS

Figure 1:
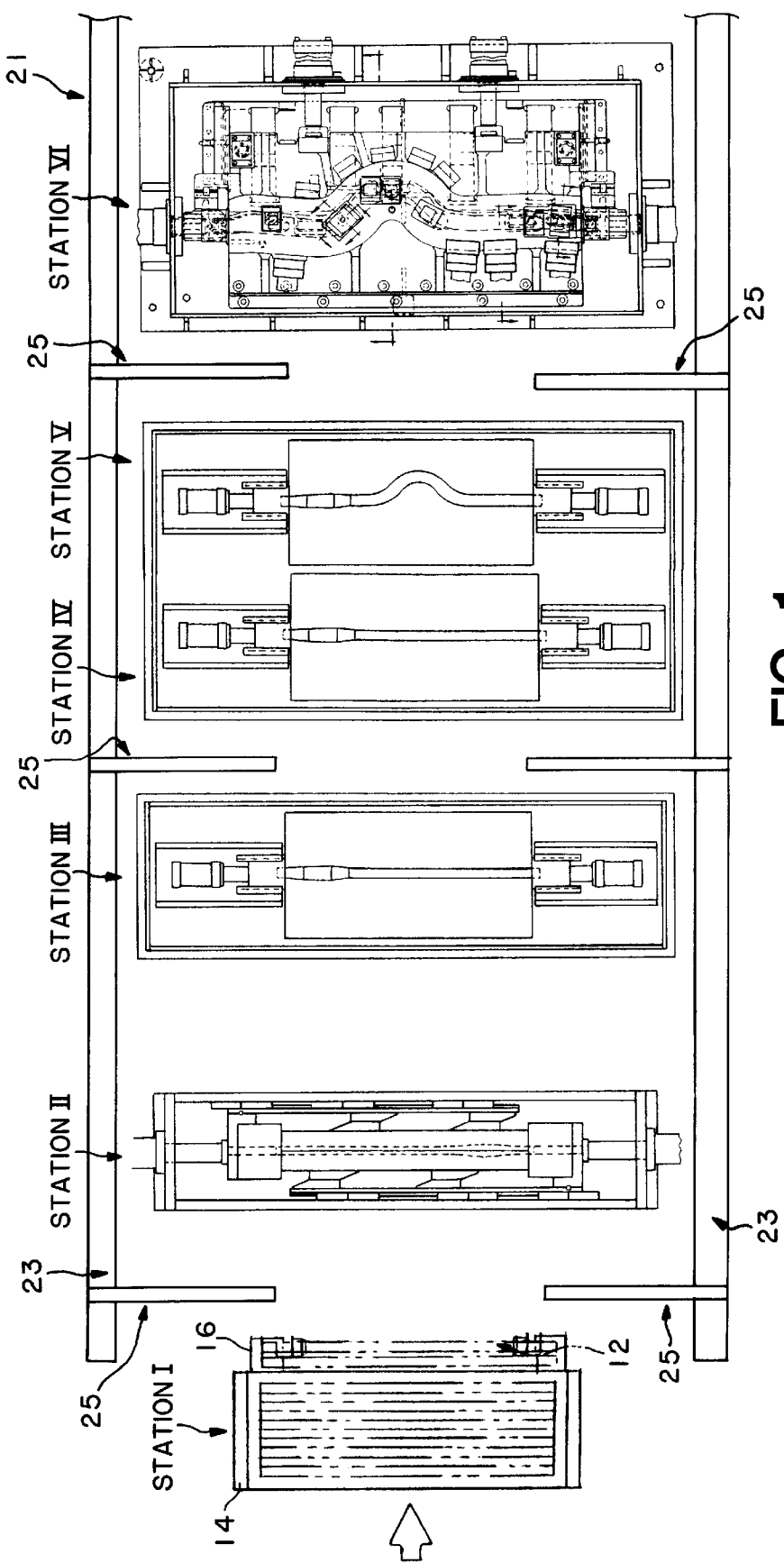
FIG. 1 is a plan view of the apparatus for forming and hydropiercing a complex shaped frame member in accordance with the preferred embodiment of the present invention.

FIG. 1 illustrates an apparatus according to a preferred embodiment of the present invention for forming and piercing a complex shaped frame member. In particular, the frame member may have varying vertical, horizontal and/or cross-sectional profiles. In accordance with the presently preferred embodiment, the frame member comprises the rear rail member for an automobile. The invention described herein, however, may be adapted to form tubular frame members for a variety of purposes and structures including space frame members. The apparatus shown in FIG. 1 has a series of stations which perform various toolings on a blank.

Figure 2:
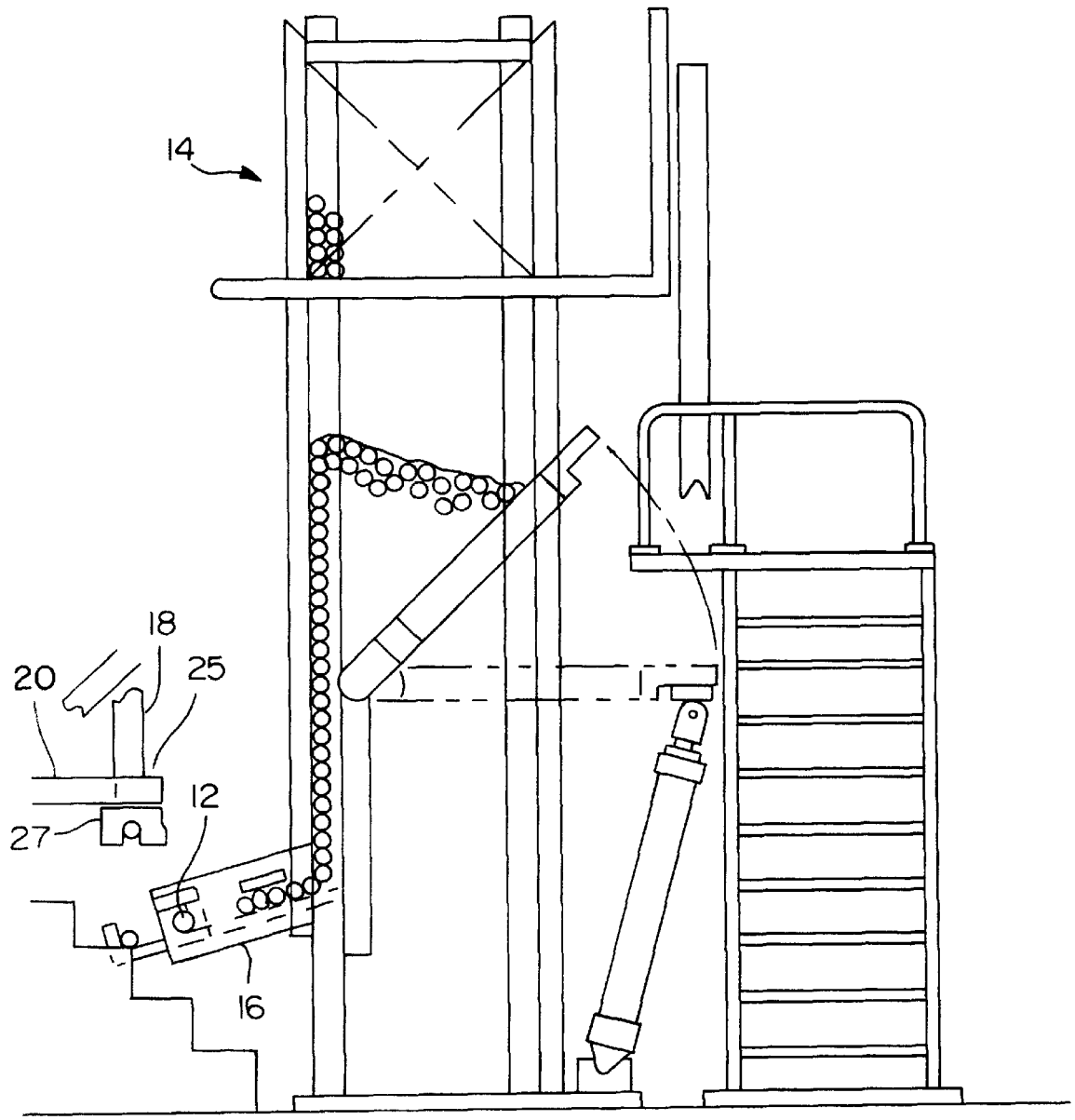
FIG. 2 is an elevational view of station I of FIG. 1.

Generally, the apparatus at station I shown in FIG. 2 delivers a tube blank 12 from a hopper 14, down a ramp 16 to a lifting mechanism 18 of a shuttle transfer 20 which delivers the blank 12 to the liquid-filled tub of station II. In the tub at station II, the blank 12 is exposed to compressive forces while being internally pressurized to create a varying diameter tube and, in particular, to form a bulge in the tubular blank. The lift mechanisms of the transfer shuttle system, which will be described in detail hereinafter, transfer the blank, preformed tube or final form tube from station to station. After a bulge has been formed in the blank 12 at station II, the bulged tube is transferred to station III where it is preformed by introducing a bend therein. The preformed tube is then transferred to station IV where the bend in the preformed tube is increased. The bent tube is then transferred to station V where a bend is introduced, the bend being in a different plane from that of the bend introduced at stations III and IV, and the cross-section of the tube is altered to form a finished tube. The tube is then transferred to station VI where holes are pierced at various locations along the frame member. The pierced tube is then transferred to an end cropping station where the ends of the tube are cropped and another piercing station where holes are pierced on the ends of the frame member. The frame member is transferred to a flushing station where the interior of the frame member is flushed of slugs before the tube is unloaded.

Many stations are located in a tub which is filled with a liquid wherein the tooling that occurs on the tube at the station is performed substantially submerged as will be described in detail hereinafter. The liquid used in a preferred embodiment of the present invention is 95% water. The remaining 5% consists of additives to prevent rust and corrosion and to aid in lubrication. This liquid is commercially available under the name Hydrolubric 143 from E.F. Houghton and Company. While some stations are illustrated as having a separate tub associated therewith, other stations may be placed in one tub or the entire apparatus including all of the stations may be placed in one tub. In addition, idle stations may be placed between stations.

The shuttle transfer system 20 includes generally fixed basic support beams (not shown) which support a traveling shuttle 21. The traveling shuttle 21 includes two long box beams 23 attached to one another by cross rails (not shown) at each end. The two traveling beams having lifting mechanisms associated therewith and in particular the lifting mechanisms include pairs of fixture arms 25 (some of which are illustrated in FIG. 1) mounted to the beams 23. Each pair of fixture arms 25 project inwardly from the beams to a position over the center of the ends of the part to be transferred. Each fixture arm 25 has a clamp fixture 27 (see FIG. 2) associated therewith which travels up and down to serve the stations of the system. The transfer system is designed so that the shuttle can return to the previous station after delivering its part to the next station in line while each station performs its tooling on the part delivered to the station.

Thus, the first pair of fixture arms are positioned over the end of the ramp 16 of station I. The clamp fixtures of the arms are lowered to clasp each end of the blank at the end of the ramp. The clamp fixtures are raised and the arms translate to a position over the tub of station II. The clamp fixtures are then lowered and the blank is released in the tub of station II. The arms then translate back to their previous position over station I and wait for the next blank. Meanwhile, the second pair of fixture arms are translated to a position over station II. When the tooling is completed at station II, the clamp fixtures of the second pair of arms are lowered to clasp the bulged tube formed by station II. The clamp fixtures are raised and the second pair of arms are translated forward to a position over station III. The clamp fixtures are then lowered and the bulged tube is placed in the tub of station III. The clamp fixtures are then raised and the second pair of arms are translated back to their previous position over station II. As the part is being moved from station II to station III, a blank is delivered from station I to station II as described above. The remaining pairs of fixture arms perform in a similar manner with respect to stations III–VI except that at station V the blank is rotated preferably 90° before being placed on the die. The transfer arms used to deliver the tube to station V therefore include a rotator cup to rotate the tube. For a detailed description of a transfer system that can be used with the present invention, reference is made to U.S. Ser. No. 07/837,081 which is incorporated herewith. Other types of transfer systems of course can be used to deliver the tube from one station to another. Alternatively, the tube can be manually transferred from station to station.

Starting Material

The tubular blank is preferably a welded circular steel tube formed from cold rolled aluminum killed steel. The blank has an outer diameter preferably of about 101.6 mm (4.00 inch) with a starting thickness preferably ranging from about 2.10 mm (0.083 in.) to 2.50 mm (0.098 in.). The material has an initial yield point of 34,000 p.s.i. and with significant work hardening during forming, the yield strength approaches 52,000 p.s.i.

STATION I

FIG. 2 is an elevational view of station I of FIG. 1. Station I includes a blank feeder and burnishing station. Station I generally includes a hopper 14 with a pair of agitators (not shown), a ramp 16 with a tube blow-out device (not shown), and a pair of burnishing units (not shown) preferably at the end of the ramp 16. Station I of the present invention is identical to that described in U.S. Ser. No. 07/837,081 which is incorporated herein by reference and thus need not be described in detail. One blank at a time is delivered to the burnishing unit where the outer ends of the blank are burnished. While the foremost blank is being burnished, a high pressure air blast is delivered to the tubular blank next in line to remove any loose dirt or debris from the blank. After the blank has been burnished, rollers (not shown) at the bottom of the ramp 16 rotate the blank. As the blank is rotated, a light beam, preferably from a laser, is used to detect the welded seam in the blank. Once the seam is detected, the rollers stop so that the seam of the blank is properly oriented before it is delivered to the stations II–VI.

STATION II

FIG. 3 illustrates the plan view of apparatus 30 of hydroforming station II. The apparatus 30 of station II is located in a tub 32 defined by a base 34 and side walls 36 which is filled with the liquid described above. The apparatus 30 generally includes two die halves 38 and 40, a combination of sealing unit 42, and lock block 44 located at opposite ends 46 and 48 of the die halves 38 and 40, a shuttle mechanism 50 located along the inner sides of the tub 32 and hydraulic cylinders 54. The shuttle mechanism 50 is activated by the sealing units 42 to bring the two die halves together as well as translate the lock blocks 44 to their engaged position. FIG. 3 illustrates the lock blocks and sealing units in their engaged position. The shuttle mechanism 50 will be described in detail hereinafter The closed die halves define therein a die cavity as shown by dashed lines 51.

FIGS. 4–6 illustrate a side, cross-sectional view of one-half of hydroforming station II shown in FIG. 3 with the lock block 44 and sealing unit 42 located in various positions. While only one half of station II is illustrated in FIGS. 4–6, station II is generally symmetrical about centerline 56. In FIG. 4, the lock block 44 and sealing unit 42 are shown in their retracted position. Brackets 58 mounted to the base 34 of the tub 32 are located near each end of the die halves and are used to hold the blank 12 concentrically inside the die cavity 60 formed by the die halves. The die halves have recesses therein (not shown) which allow the dies to close around the brackets 58. The tube defined by the die cavity has a bulged region 77 located near one end of the cavity 60. The tube defined by the die cavity preferably has a tapered cross-section on each side of the bulge region 77. While the bulge region 77 is shown located near one end of the die cavity 60, it can be located along any portion of the die cavity 60. In addition, multiple bulges may be provided in the die cavity. As shown in FIG. 4 the outer diameter of the tubular blank 12 is less than the diameter of any section of the die cavity 60.

The length of the tubular blank 12 must be longer than the length of the tube defined by the die cavity 60. Thus when the blank 12 is placed in the die cavity 60, the ends 62 of the blank 12 extend outside of the die cavity 60 as shown in FIG. 4. Preferably the die cavity has a length of 98 inches while the tubular blank 12 has a length of 112 inches. The present invention, however, can be used with other size tubes and die cavities and is not limited to the specific dimensions described.

The lock block 44 and sealing unit 42, located at opposite ends of the die halves, are supported by a track assembly 64 along the base 34 of the tub. The track 64 allows the lock block 44 to be translated by the shuttle mechanism 50 (see FIG. 3) along the base 34 of the tub 32 in a direction perpendicular to the center line 56 of apparatus 30. The sealing unit 42 is engaged with cylinder 54 through the sidewall 36 of the tub 32. The piston 55 of the cylinder 54 translates the sealing unit 42 in a direction perpendicular to the center line 56 of apparatus 30. As will be described in detail, one of the cylinder 54 activates the shuttle mechanism 50 which causes the die halves to close and the lock blocks 44 to engage the ends of the die halves.

The lock block 44 has a cylindrical bore 68 extending horizontally therethrough. The block 44 has a front surface 70 and a back surface 72. The back surface 72 is substantially planar. The front surface 70 has defined therein a cylindrical recess 74. Each die half has one-half of a cylindrical ledge 76 formed on the side of the die adjacent to the opening of the die cavity. When the die halves are brought together, a cylindrical ledge 76 is formed around the opening to the die cavity 60. The cylindrical ledge 76 is dimensioned to fit inside the cylindrical recess 74 in the front surface 70 of the lock block 44. The block 44, when translated to its engaged position, will thus lock the two die halves together as will be described in greater detail hereinafter. The bore 68 extending through the block 44 is counterbored at the front surface 70 to define a chamfer 78. The diameter of the bore 68 is slightly larger than the outer diameter of the tubular blank 12. The chamfer 78 which has a diameter greater than the diameter of the bore 68 allows the block 44 to engage the exposed end 62 of the blank 12 even if the bore 68 and blank 12 are slightly misaligned.

The sealing unit 42 has a generally cylindrical rod portion 80 extending perpendicularly from the center of a base 82. The rod 80 is mounted to the base 82 by conventional means as will be appreciated by those skilled in the art. The diameter of the rod 80 is slightly less than the diameter of the bore 68 in the lock block 44. A portion of the rod 80 has been milled away at one end to create a chamfer 84. The diameter of the rod 80 along the chamfer 84 is less than the inner diameter of the blank 12 so that only the end portion of the rod 80 can be inserted into the blank 12 as will be described in detail hereinafter. The diameter of the rod 80 located distally from the chamfer 84 is substantially the same as the inner diameter of the blank 12. A lumen 86 extends through the rod 80 and a portion of the base 82 of the sealing unit 42. A source of pressurized fluid (not shown) is connected to one end of the lumen at 88, while the other end of the lumen 86 communicates with the interior of the blank 12 when the sealing unit 42 is translated to its engaged position as will be described in detail hereinafter.

With reference to FIGS. 5 and 6, one of the hydraulic cylinders 54 is activated to cause piston 55 to extend towards the die halves. Piston 55 drives the shuttle mechanism 50. The shuttle mechanism 50 shown in FIG. 3 includes two rail members 90 having angular driver 91 and dwell 92 surfaces located thereon. Located along the sides of the die halves are opposing angular driver 93 and dwell 94 surfaces.

As the piston 55 extends, the rails 90 travel which cause the angular driver and dwell surfaces located on the rails and die halves to engage. As these surfaces engage, the die halves are forced to travel in a direction perpendicular to the rails 90 to cause the die cavity to close. The lock blocks 44 are simultaneously translated towards the die halves. As the lock blocks 44 translate, the exposed end of the blank 12 enters the bore 68 of the lock block 44. The block 44 continues to translate towards the die halves until the cylindrical recess 74 formed in the front surface 70 of the block 44 surrounds the cylindrical ledge 76 on the sides of the die halves. The recess 74 thus locks the die halves together and prevents them from separating during the forming process. The sealing unit 42 continues to be translated by the piston rod 55 communicating with cylinder 54 towards the lock block 44. The rod 80 of the sealing unit 42 is inserted through the bore 68 of the block 44. With a portion of the blank 12 also located in the bore 68, the end portion of the rod 80 enters the interior of the blank as seen in FIG. 5. With the rod 80 of the sealing unit 42 fully engaged with the tube end, fluid is first pumped through the tube to expel any air that may have been trapped inside the tube when it was placed in the tub. After the tube has been purged, the sealing units are activated to apply pressure to the interior of the tube 12.

Since only the end portion of the rod 80 can enter the blank, the sealing unit 42 places the blank under compression as it continues to translate towards the die halves. Simultaneously, pressurized fluid is delivered to the interior of the blank through the lumen 86 of the sealing unit 42.

As described previously, station II is generally symmetrical about its center line 56 therefore the opposite exposed end of the blank 12 (not shown) also has an identical lock block and sealing unit (not shown) associated therewith. There are, however, variations which may be made to station II to accomplish the objects of the present invention. For example, station II may be asymmetrical with only one sealing unit at one end of the tube. In addition, the shape defined by the die cavity may be asymmetrical about the center line. The present invention is not limited to the particular parts illustrated but may be used to create various parts to be used in many areas such as automotive, which require tubing having various shapes.

The operation of station II will now be described with reference to FIGS. 3–6. At the end of the burnishing operation of station I, the die halves 38 and 40 are open and the lock block 44 and sealing units 42 are retracted. Upon release from the burnishing units, the transfer shuttle system transfers the blank 12 to the tub 32 of station II. The blank 12 immediately sinks into the bath below the fluid level and is supported by brackets 58. The forming operation of station II is performed completely submerged in the aqueous bath within the tub 32. Because the blank 12 is submerged in the fluid filled tub 32 before the lock block 44 and sealing units 42 engage its ends, the interior of the blank is filled with the liquid. A limit switch (not shown) may be provided which signals the receipt and proper placement of a blank in the ready position. Limit switch, along with any other appropriate and desired sensors may be disposed throughout apparatus to send signals to a microprocessor (not shown) which governs the overall operation of machine.

After verification of the proper positioning of the blank 12, at least one hydraulic cylinder 54 is activated to cause the shuttle mechanism 50 to force the die halves 38 and 40 together to their closed position as shown in FIG. 3. The tubular blank 12 is now supported by brackets 58 concentrically within the die cavity 60 formed by the die halves 38 and 40. The shuttle mechanism 50 also translates the lock blocks 44 toward the die halves. The exposed ends of the blank 12 are inserted in the bores of the lock blocks and the blocks are translated towards the die halves until the cylindrical recesses 74 formed in the front surface 70 of the blocks 44 surround the cylindrical ledges 76 formed on the sides of the die halves. The die halves are thus locked in place by the lock blocks 44 which prevent their separation during the formation process.

The sealing units 42 are also translated towards the lock blocks 44 by the pistons 55 of cylinders 54 and the rod 80 of each sealing unit 42 enters the bore 68 of the lock block 44. The end portion of the rod 80 is inserted into the interior of the blank 12 located within the bore 68. The tube 12 is purged of any air trapped therein. The sealing unit 42 continues to translate towards the block 44. As it does, pressurized fluid is delivered to the interior of the blank 12 through lumen 86 while the blank 12 is placed under compression by the advancing sealing unit 42. The sealing unit 42 continues to translate towards the block 44 until the base 82 of the sealing unit 42 is brought into contact with the back surface 72 of the block 44.

As described previously, before the lock block 44 and sealing units 42 engage the blank 12, the interior of the blank 12 is filled with the fluid of the aqueous bath since the blank is submerged below the surface of the bath. When the block and sealing units engage the blank, the internal pressure of the blank is increased by supplying pressurized fluid to the interior of the blank through the lumen 86 of the sealing unit 42. The internal pressure applied to the tube is above the yield limit of the tube. Simultaneously the sealing units 42 translate towards the die halves and thereby place the tubular blank under compression. The compressive force applied by the sealing units 42 acts in combination with the pressurized interior of the blank 12 to assist in allowing metal to flow into the die cavity 60. This interaction of the compressive force applied to the end of the blank and the pressure applied to the interior of the blank causes the tubular blank to fill the die cavity 60 defined by the die halves 38 and 40 while decreasing the amount of thinning of the tube wall. Instead, metal from the ends of the tubular blank 12 is allowed to flow into the die cavity 60. As the metal from the ends of the blank flow into the die cavity 60, the sealing units 42 translate to remain engaged with the ends of the blank as shown in FIG. 6. It can be seen that the length of the tubular blank has shortened from its original length as shown in FIG. 4 to its final length as shown in FIG. 6.

The circumference of each section of the tube formed by station II is selected to be substantially equal to the perimeter length of each section of the desired finally formed rail member as will be discussed in detail hereinafter. Therefore the finally formed rail member can be produced by simply reshaping the tube formed by station II without further expansion of the tube.

It was discovered during the operation of station II that the blank is prone to plastic buckling of the tube wall. This plastic buckling leads to the tube spiralling within the unoccupied die cavity regions thereby creating folds in the wall of the tube where there is a rapid change in the diameter of the die, such as in the bulge region 77. It was found that the magnitude of the spiralling can be reduced by increasing the internal pressure of the blank and increasing the pressure exerted on the ends of the blank by the sealing units, as it is being formed. The increased internal pressure must be sufficient to stabilize the blank wall without causing the blank to burst. It was found that increasing the internal pressure of the tube from about 1,500 p.s.i. to about 3,100 p.s.i. and increasing the external pressure from about 750 p.s.i. to about 2,000 p.s.i. helped reduce the buckling.

The internal and external pressures applied to the tube are regulated by electronic and pneumatic control systems as is well known by those skilled in the art. The increase in internal pressure applied to the tube can be achieved by a mechanical intensifier.

A 112 inch blank having a diameter of 4.00 inches with a wall thickness of approximately 0.095 inches exposed to the above-described pressures and forces created a bulged tube having a final length of 107 inches with a 5.41 inch outer diameter bulge. The thickness of the tube wall in the bulged region was reduced by approximately 5 to 7% and it is believed that smaller reductions in thickness may be possible. Greater expansions have been achieved, such as a 50% increase in diameter, however, the length of the blank must be sufficient to allow the blank material to flow into the die cavity to reduce the amount of thinning in the tube wall. Consistent with other considerations, if the tubular blank is of sufficient length, the finished bulge diameter could exceed 100% expansion with zero thinning. However, in a preferred embodiment, frictional constraints and the rate of deformation (i.e., strain hardening rate) suggest useful production applications of approximately 50% expansion.

After the tube has been expanded, the pressure applied to the interior of the tube is turned off. A purge valve (not shown) is opened to release the internal pressure in the tube. The pistons 55 and attached sealing units 42 are retracted causing the rails 90 of the shuttle mechanism 50 to translate the lock blocks 44 away from the die halves. After the cylindrical recess 74 on the front surface 70 of each block 44 no longer surrounds the cylindrical ledge 76 of the die halves, the shuttle mechanism 50 causes the die halves to open.

Once the die halves are opened, the tube may be lifted from the tub of station II and delivered to the tub of station III by the shuttle transfer system 20.

STATION III

At station III, the bulged tube is preformed. In particular a bend is introduced into the bulged tube as can be seen in FIG. 7. The bend introduced at station III will be increased at station IV which will be described in detail with reference to that station and FIG. 15. Preferably the radius of the bend in the tube will decrease from a radius of about 350 mm to a radius of about 200 mm. While a specific embodiment with specific dimensions is described, the present invention is not limited to such dimensions and shapes. It was found that preforming the tube instead of initially creating a small radiused bend reduced the amount of folding of the tube material along the insides of the bends.

Figure 8:
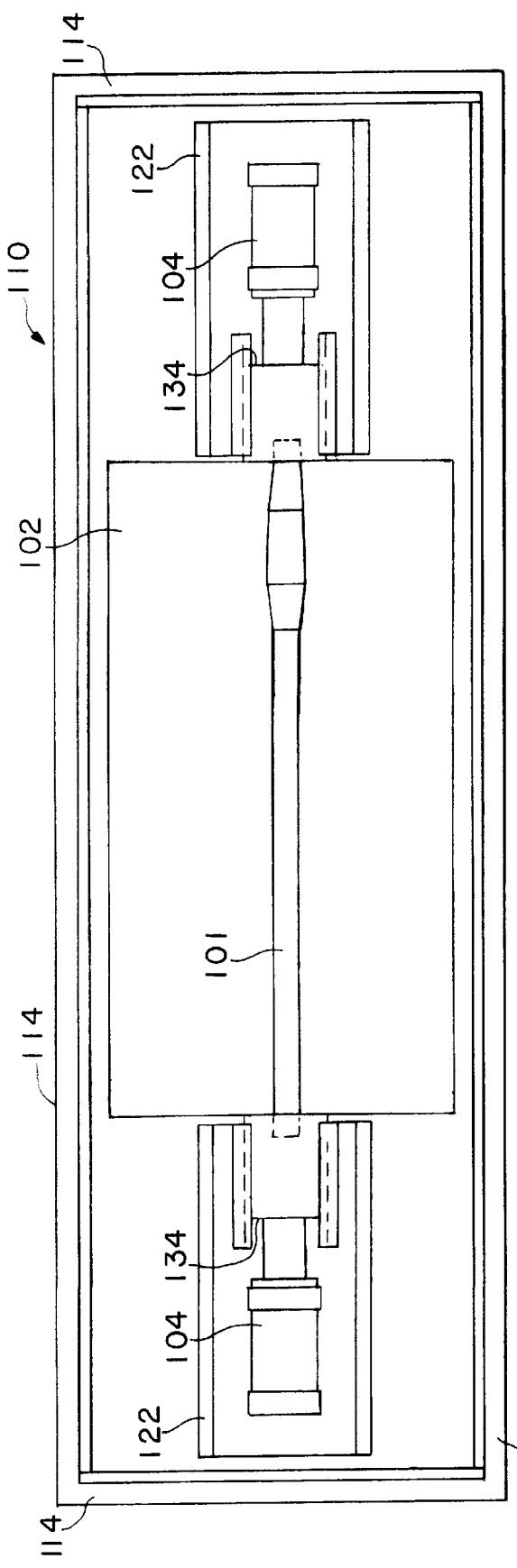
FIG. 8 is a plan view of hydroforming Station III shown in FIG. 7 with the punch removed.

FIG. 7 is a side, cross-sectional view of hydroforming station III with the punch 100 lowered over the die 102 and sealing units 104 engaged with the ends of the tube formed in the die cavity. Station III as shown in FIG. 14 generally includes a variable ram speed press 106 capable of dwell time at the end of its stroke having a pair of overhead hydraulic cylinder assemblies 108 which vertically reciprocate the punch 100. A tub 110 having a base 112 and sidewalls 114 is filled to an appropriate level with the same aqueous solution contained in the tub of station II. With reference to FIG. 7, the punch 100 is shown in its lowered position. As is apparent from this cross-sectional view of station III, the die cavity formed by the die 102 and the punch 100 defines a vertically bent tube. Specifically, the vertical bend is formed by creating three alternating bends in the tube at 116, 118 and 120 simultaneously. Bend 118 has a radius preferably of about 350 mm while bends 116 and 120 have a radius of about 338 mm and 186.5 mm respectively. Of course bends of differing radii can be formed in the tube. FIG. 8 illustrates the plan view of Station III with the punch 100 removed. As can be seen from FIGS. 7 and 8, only the vertical profile of the bulged tube is altered at station III. While the bend 118 is referred to as vertical, the tube can be rotated so that the bend is horizontal or in any other plane. Conventional bending apparatuses known to those skilled in the art have been used to bend tubes with a constant diameter throughout the length of the tube. Because the tube formed by the apparatus of station II is tapered, these conventional bending apparatuses can not be used to bend the tapered tube.

The sealing units 104 shown in FIG. 7 are each mounted on a riser 122 located adjacent to the sides of the die 102. The riser 122 is secured to the base 112 of the tub 110 by appropriate means such as bolts or screws (not shown). FIGS. 9 and 10 illustrate the sealing unit 104 in plan view and cross-section respectively. Each sealing unit 104 includes a hydraulic cylinder assembly 130 having an outwardly extending piston rod 132 with a sealing slide tool 134 rigidly connected to the end thereof. Tool 134 defines a bore 136 within which are seated two O-rings 138 and 140. The first O-ring 138 is located a short distance back from the leading edge 142 and the second O-ring 140 is located a short distance from the first O-ring 138. Bore 136 is counterbored to form a lead-in 144 to allow for any misalignment between the end of the tube and the bore 136. Each tool 134 is mounted for reciprocal sliding movement by gibs 146 along the corresponding common axis 148 of piston rod 132 and of the end of the tube as initially placed upon the die. Each tool 134 defines a pair of outwardly extending flanges 150 which extend into mating slots 152 in gibs 146.

FIG. 11 illustrates a cross-section of a gripper 160 mounted in the sealing unit 104 of FIGS. 9 and 10 according to a preferred embodiment of the present invention. It has been found that forming small radius bends in a tube causes metal from the ends of the tube to be drawn into the die cavity too quickly which causes the metal to double up particularly on the inner radii of the bends. To prevent this a gripper 160 is provided to control the flow of the metal from the ends of the tube during the formation process. The gripper 160 comprises a cylindrical block 162 having a fluid hole 164 extending therethrough. Pressurized fluid is delivered to the interior of the tube through the hole 164. Counterbores 166 are provided around the fluid hole 164 to bolt the gripper 160 inside the bore 136 of the sealing unit 104. As will be described in detail hereinafter, the counterbores 166 for the screws of the gripper are 0.010 inches larger than the diameter of the screws 167. By making the counterbores 166 larger than the screws, the gripper is allowed to float to the bottom of the bore 136 of the sealing unit 104. The significance of the gripper being able to float in the bore of the sealing unit will become clear when the operation of the sealing unit with the gripper is described. Located on the exterior of the gripper 160 are a set of beads 169. The diameter of the gripper 160 is less than the inner diameter of the tube so that the tube fits over the exterior surface of the gripper 160 as shown in FIG. 11.

The gripper 160 is mounted inside of the bore 136 of the sealing unit 104 preferably by screws 167, however, other conventional means may be used as long as the gripper is able to float in the bore of the sealing unit 104. A gap is created between the exterior surface of the gripper 160 and the surface of the bore 136 which allows the end of the tube to fit therebetween as shown in FIG. 11. A plunger 170 (see FIG. 12 for a side view) is provided to vertically move through an aperture 172 in the sealing unit 104 so that the plunger 170 can be lowered over the set of beads 169 on the gripper 160. Conventional means such as hydraulic cylinder 103 (see FIG. 7) for example may be used to translate the plunger 170 between its raised and lowered positions. The plunger 170 is used to press the tube against the set of beads 169 thereby gripping the ends of the tube and controlling the flow of metal into the die cavity.

FIG. 12 illustrates a side view of the plunger 170 shown in FIG. 11. The surface of the plunger 170 shown at 173 is curved to conform to the exterior surface of the tube. Preferably the radius of curvature of the plunger is about 1.9 mm.

FIG. 13 illustrates in detail a bead which is preferably formed on the exterior surface of the gripper. The bead preferably has a height H of about 0.030 inches and a width W of about 0.015 inches. The top surface of the bead is horizontally planar while the sides of the bead are preferably vertical. The sides of the bead lead into the exterior surface of the gripper 160 at a radius R preferably no more than 0.020 inches. The structure of the bead causes it to bite into the tube material thereby controlling the flow of material into the die.

The operation of the sealing unit 104 and the gripper 160 will now be described. While only one sealing unit 104 is illustrated, the sealing unit at the opposite end of the tube also has a gripper mounted therein. While a gripper was used in each sealing unit to form this particular part, the decision to use a gripper will depend upon the particular part being formed. A gripper could be located in one sealing unit and not the other or a gripper may not be necessary in either sealing unit. When the sealing unit 104 is translated to engage the end of the tube 101, the end of the tube enters the bore 136 and slides over the gripper 160. The end of the tube is thus sandwiched between the gripper 160 and the bore 136. Once the sealing unit 104 is engaged with the end of the tube, the plunger 170 is lowered through the aperture 172 in the sealing unit 104 so that the curved surface 173 of the plunger 170 presses against the exterior surface of the tube. The pressure applied by the plunger 172 presses the portion of the tube adjacent to the plunger surface 173 onto the set of beads 169 of the gripper. The pressure applied by the plunger 170 causes the gripper to vertically translate to the bottom of the bore 136 of the sealing unit 104 where the bottom section of beads 169 press against the bottom portion of the tube. The gripper 160 is able to move when pressure is applied by the plunger 170 because of the floating arrangement provided by the counterbores 166 and the screws 167 as described above.

While the beads 169 on the gripper 160 of FIG. 11 are shown as extending uniformly around the circumference of the exterior surface of the gripper, various other configurations may be used. For example, it was found that the portion of the beads 169 nearest the plunger surface 173 could be removed from the gripper located in the sealing unit closest to the bulged section of the tube. In addition, the present invention can be practiced with one or a plurality of beads. The gripper 160 in combination with the plunger 170 controls the amount and rate of tube material flowing into the die cavity formed by the die 102 and punch 100. By controlling the amount of material flowing into the die cavity there may be, however, an accompanying thinning of the walls of the tube. To compensate for this effect, in a preferred embodiment a tubular blank having a gauge value one greater than that of the desired finished frame member is used.

FIG. 14 illustrates a cross-sectional view of hydroforming station III of FIG. 7. Die 102 defines a vertical punch engaging wall 200 the base of which smoothly transitions into upwardly facing ledge 200 which defines the bottom half of the part print formed in the die cavity. Below and to the left of ledge 202, die 102 defines a contoured and vertical heel 204. Heel 204 is contoured to telescopically engage the die engaging wall 206 of the punch 100 which will be described in detail hereinafter. Punch 100 defines a complementary, downwardly extending portion which defines a vertical die engaging wall 206. Wall 206 at its top smoothly transitions into a downwardly facing ledge 208 which defines the upper half of the part print formed in the die cavity. Punch 100 further defines, to the right of ledge 208, a vertical heel 210. Heel 210, like heel 204 of the die 102, is contoured to telescopically engage the punch engaging wall 200 of the die 102 in substantially complete adjacent engagement. That is, as the punch 100 rams vertically downward, ledge 208 is in constant vertical alignment with ledge 202, vertical heel 210 slides along vertical wall 200 and vertical wall 206 slides along vertical heel 204.

While the punch engaging wall 200 smoothly transitions in the ledge 202, the transition between the ledge 202 and heel 204 forms a severely acute angle as seen at 212. The entire intersection between ledge 202 and heel 204 is radiused off with a radius of approximately ¹⁄₁₆th of an inch. This radius may vary depending on the characteristics of the tube being formed and the forces to which it is to be subjected. In the present embodiment, a ¹⁄₁₆th inch radius at 212 is too small to result in outward formation of the tube at 212 during the below-described step of internally pressurizing the tube. The transition among the die engaging wall 206, ledge 208 and heel 210 of punch 100 are similarly related.

Ledges 202 and 208 in the present embodiment both vary vertically over their length as can be seen from FIG. 7. The central sections 214 and 216 respectively as seen in FIG. 7 of both ledges project downwardly. Thus, when the horizontally straight bulged tube from station II is laid upon the die 102 of Station III, the tube only contacts ledge 202 at the front and rear portions 218 and 220 respectively of the die 102 as shown in FIG. 7. When the punch 100 is rammed down towards the die 102, only the central downwardly projecting portion 214 of ledge 208 first contacts the tube. Further downward movement of the punch 100 will of course begin to bend the tube between the ledges 202 and 208.

When the punch 100 is fully extended and engaged with die 102, ledges 202 and 208 form a closed cavity as seen in cross-section in FIG. 14 which defines the part print of a preformed tube. The limits of vertical movement of the punch 100 are controlled by transducers which govern the operation of the cylinder assemblies.

The operation of station III will now be described with reference to FIGS. 7–14. With the punch 100 in its upwardly retracted position and the sealing units 104 fully retracted, the transfer system delivers the tube from station II to station III and places it on ledge 202 formed by the lower die 102. The lift mechanism then releases the tube and retracts and the shuttle transfer returns to its idle position. The tub 110 is filled with the aqueous bath to a level which is well above the sealing units 104 and above the top of the tube as placed upon the die 102. Upon placement of tube into the tub 110 and onto the die 102, the tube is automatically filled with the solution of the aqueous bath. The lifting mechanism clears the path of the sealing units and the sealing units simultaneously, telescopically, extend around the ends of the tube. The O-rings 138 and 140 of the sealing units 104 are capable of maintaining a seal for the approximately 800 to 900 p.s.i. to be exerted within the tube. As the O-rings 138 and 140 extend to engage and seal the ends of the tube, a closed volume is formed by the tube and bore 136 except for vent ports (not shown). The interior of the tube is purged to minimize the amount of air bubbles trapped therein. The plunger 170 is then lowered over the ends of the tube in the sealing units 104.

The punch 100 then quickly rams down to a tube trapping position. At this position, the downwardly projecting central section 214 of ledge 208 is just above the tube. Also, the downwardly extending die engaging wall 206 has telescopically surrounded the tube and a portion of the die 102. At this point, the bottom edge of the die engaging wall 206 has passed below the radiused edge of the ledge 202 at its lowest point. If the tube was not completely vertically aligned with the ledge 202, die engaging wall 206 of punch 100 will cam the tube inwardly to its proper vertically aligned position. The tube is now completely trapped within a stuffing ledge cavity defined by ledges 202 and 208 and vertical walls 206 and 210 and the tube and bores 136 of the sealing units 104 are entirely filled with the solution of the bath.

With tools 134 fully extended the internal hydraulic pressure of tube roughly at the less-than-yield pressure, and the punch 100 dwelling at the tube trapping position, the punch 100 rams down to its fully extended position. With the tube completely trapped within the stuffing ledge cavity defined by ledges 202 and 208 and vertical walls 206, 210, as ledges 202 and 208 approach each other, the tube has nowhere to escape or to be pinched. Instead, the tube merely conforms to the shrinking, contoured cavity which will, upon complete extension of the punch 100, be defined entirely by ledges 202 and 208. The flexible mandrel created by the internal hydraulic pressure within the tube ensures substantially uniform, non-buckling deformation of the tube according to the shape of the ledges 202 and 208. During the formation process the ends of the tube are drawn towards the die cavity. In order to remain engaged with the tube ends, the sealing units also translate toward the die cavity.

After completion, appropriate valve means (not shown) vent the remaining pressure in the tube to the bath. As soon as the pressure inside the tube is dropped, the tools 134 are then retracted and the punch 100 is rammed up to its retracted position. The transfer shuttle system then delivers the tube to station IV.

It was found that the pressure exerted inside the tube had to be reduced during the formation process in order to maintain a constant pressure within the tube. The internal pressure maintained in the tube throughout the stroke of the press preferably ranges from about 800 to 900 psi. The internal pressure is monitored and controlled by means known to those skilled in the art and therefore need not be described in detail.

STATION IV

Figure 15:
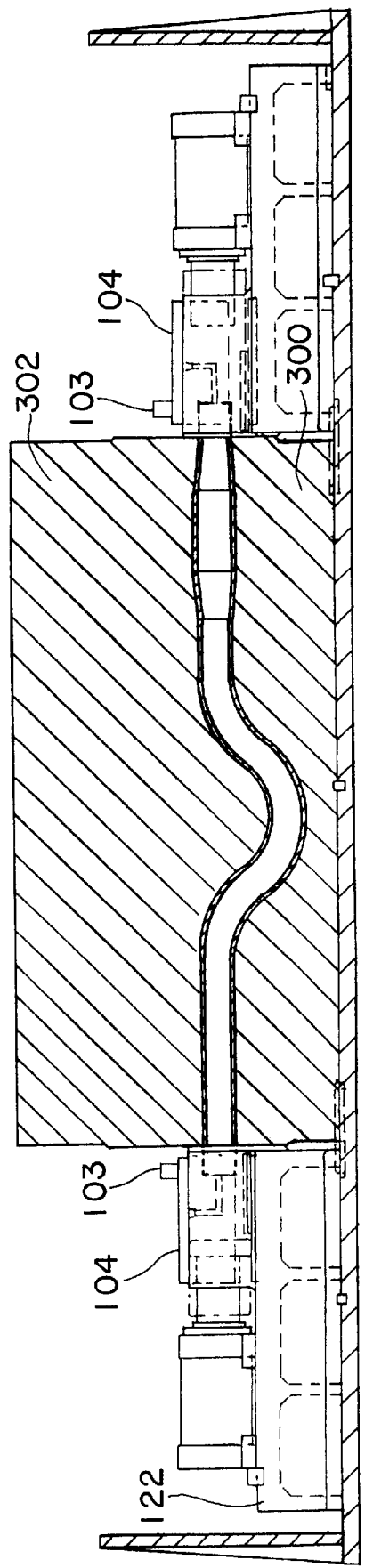
FIG. 15 is a side, partial cross-sectional view of the hydroforming Station IV of FIG. 1 with the punch lowered upon the die and the sealing units engaged with the ends of the tube.

FIG. 15 illustrates a side, cross-sectional view of hydroforming station IV where the preformed tube of station III is further bent so that a vertical bend preferably having a radius of 200 mm is formed. Station IV is substantially identical to station III except for the die cavity formed by the die 300 and punch 302 therefore the same reference numerals are used to identify identical parts. Specifically, the plan view of the mold cavity formed by the die and punch of station III shown in FIG. 8 is the same for station IV. Therefore, like station III, station IV only alters the vertical profile of the tube. Station IV operates in a manner identical to that of station III and therefore need not be described in detail. The same internal pressure as used in station III is maintained in the tube at station IV.

It was found that the thickness of the tube formed at station IV increased approximately 14% on the inside of the bends while the thickness of the tube decreased by approximately 17% on the outside of the bends. The thickness of the bulge region remained substantially unchanged.

After completion, the internal pressure is removed, the tools are then retracted and the punch is rammed up to its retracted position. The shuttle transfer system then delivers the tube to station V. The tube is rotated 90° before it is placed on the die of station V.

STATION V

Next a lateral bend and a change in the cross-section of the tube are introduced into the bulged and vertically bent tube. The desired shape of the part preferably has a varying cross-section with both a vertically and laterally varying profile.

Figure 16:
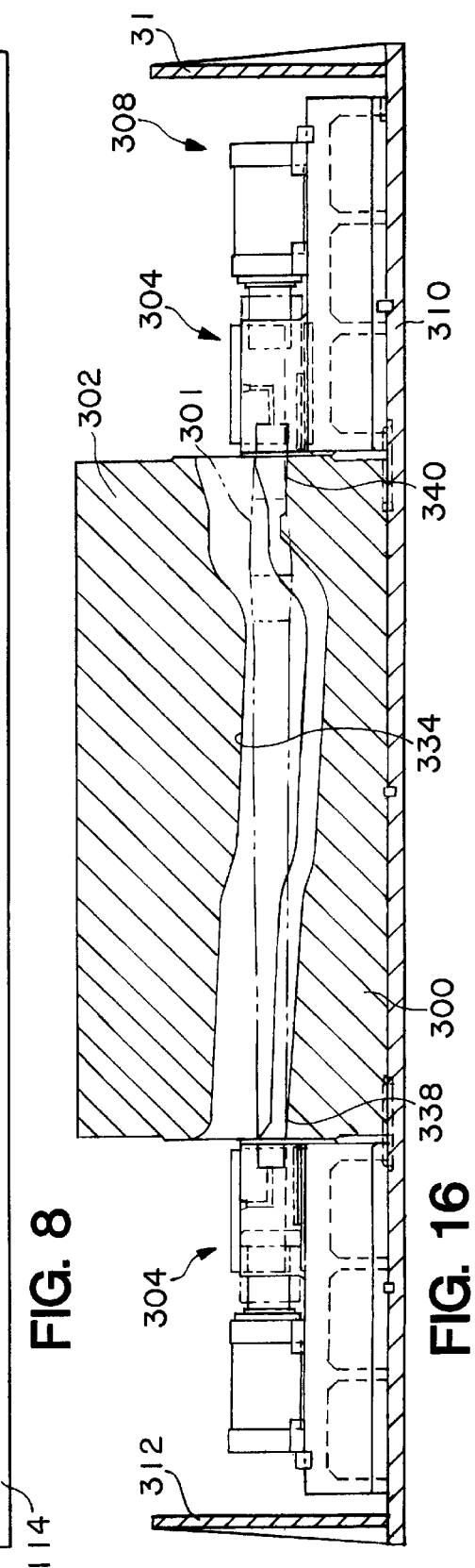
FIG. 16 illustrates a side, partial cross-sectional view of hydroforming Station V of FIG. 1 with the punch raised above the die and the sealing units engaged with the ends of the tube.

FIG. 16 illustrates a side, cross-sectional view of station V in an open position with engaged sealing units 304. Station V generally includes a variable ram speed press 307 capable of dwell time at the end of its stroke having a pair of overhead hydraulic cylinder assemblies 306 (FIG. 18) which vertically reciprocate the punch 302. A tub 308 having a base 310 and walls 312 is filled to an appropriate level with the same aqueous solution contained in the tub of stations II–IV. As shown in FIG. 1, stations IV and V preferably share one tub.

Figure 17:
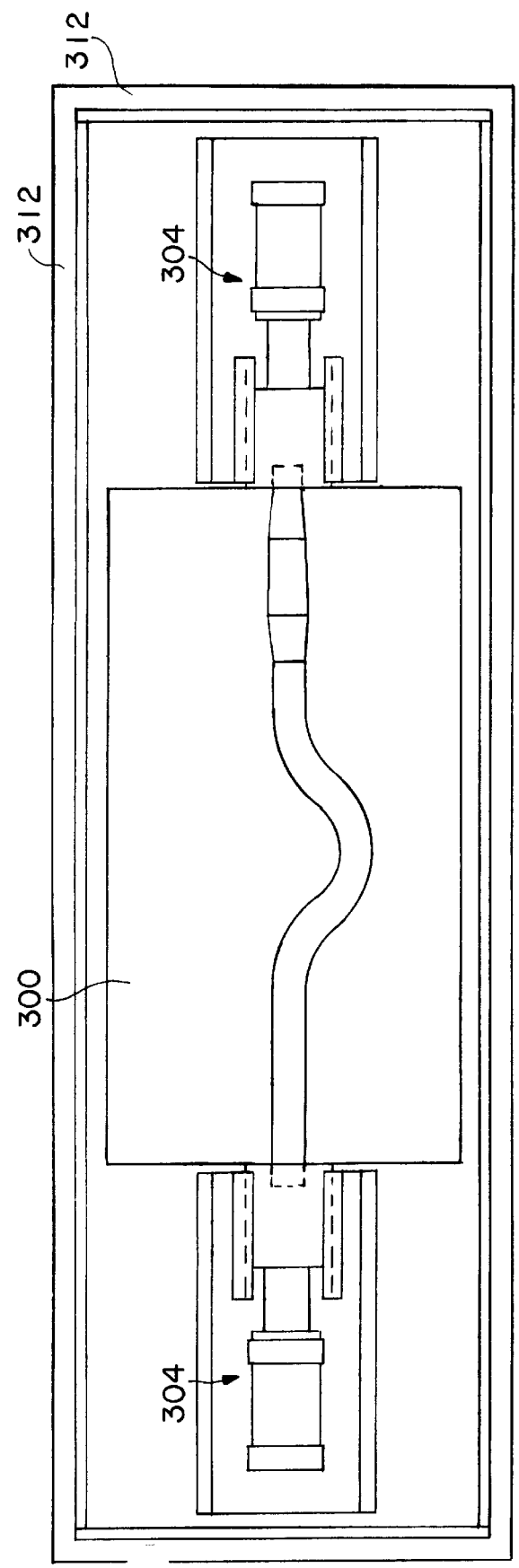
FIG. 17 is a plan view of Station V shown in FIG. 16.

FIG. 17 illustrates the plan view of the die 300 of station V. Before the tube formed by station IV is delivered to station V and placed in the die cavity of the die 300, it is rotated 90 degrees so that the vertical bend formed by stations III and IV becomes horizontal. As is apparent from FIGS. 16 and 18, the die cavity formed by the die and the punch defines a vertically bent tube with a varying, generally rectangular, cross-section. The vertical bend of station V is, however, perpendicular to that formed by stations III and IV. While the inclination of the bends formed at stations III–V are referred to as vertical or horizontal, other orientations are possible which are dependent upon the part to be produced.

Because the ends of the tube are not altered from station to station, the sealing units are identical to those described with reference to stations III and IV and thus need not be described in detail. The sealing units of Station V, however, do not have grippers as described above mounted therein.

FIG. 18 illustrates a cross-section of the die and punch of station V. Die 300 defines a vertical punch engaging wall 320 the base of which smoothly transitions into upwardly facing ledge 322 which defines the bottom half of the part print formed in the die cavity. Below and to the left of ledge 322, the die defines a contoured and vertical heel 324. Heel 324 is contoured to telescopically engage with die engaging wall 326 which will be described in detail hereinafter. The punch 302 defines a complementary, downwardly extending portion 328 which defines a vertical die engaging wall 326. Wall 326 at its top smoothly transitions into a downwardly facing ledge 330 which defines the upper half of the part print formed in the die cavity. Punch 302 further defines, to the right of ledge 330, a vertical heel 332. Heel 332, like heel 324 of the die 300, is contoured to telescopically engage the punch engaging wall 320 in substantially complete adjacent engagement. That is, as the punch rams vertically downward, ledge 330 is in constant vertical alignment with ledge 322, vertical heel 332 slides along vertical wall 320 and vertical wall 326 slides along vertical heel 324.

While the punch engaging wall 320 smoothly transitions in the ledge 322, the transition between the ledge 322 and heel 324 forms a severely acute angle as seen at 332. The entire intersection between ledge 322 and heel 324 is radiused off with a radius of approximately 1/16th of an inch. This radius may vary depending on the characteristics of the tube being formed and the forces to which it is to be subjected. In the present embodiment, a 1/16th inch radius at 332 is too small to result in outward formation of the tube at 332 during the below-described step of internally pressurizing the tube. The transition among the die engaging wall 326, ledge 330 and heel 332 of punch 302 are similarly related.

Ledges 322 and 330 in the present embodiment both vary vertically over their length as can be seen from FIG. 16. The cross-section of the die cavity as shown in FIG. 18 is generally rectangular. Both ledges project downwardly as seen in FIG. 16. Before the tube from station IV is laid upon the die of station V, the tube is rotated 90 degrees by the lifting mechanism of the transfer shuttle. The vertical bend in the tube formed at station III and IV thus lies horizontally across the die of station V as shown in phantom lines 301 in FIG. 16 and can be seen in the planar view of FIG. 17. The tube first contacts ledge 332 only at the front and rear portions 338 and 340 respectively of the die 300. When the punch 302 is rammed down towards the die 300, only the downwardly projecting portion 334 of ledge 330 will first contact tube. Further downward movement of the punch 302 will of course begin to bend the tube between the ledges 322 and 330.

When the punch 302 is fully extended and engaged with the die 300, ledges 322 and 330 form a closed cavity as seen in cross-sectional in FIG. 18 which defines the part print of a partially formed frame member. The limits of vertical movement of the punch 302 are controlled by transducers which govern the operation of the cylinder assemblies. In the present embodiment, the cross-sectional configuration of the closed cavity formed by ledges 322 and 330 varies considerably along the entire length thereof. The perimeter of the cross-section defined by the closed cavity is generally rectangular in shape as compared to the substantially circular cross-section of the tube placed therein.

The operation of station V will now be described with reference to FIGS. 16–18. With the punch 302 in its upwardly retracted position and the sealing units 304 fully retracted, the tube from station IV is delivered to station V. The tube is rotated 90° before it is placed onto ledge 322 of the die 300. The tub is filled with the aqueous bath to a level which is well above the sealing units 304 and above the top of the tube as placed upon the die 300. Upon placement of tube into the tub and onto die 300, the tube is automatically filled with the solution of the aqueous bath. The lifting mechanism clears the path of the sealing units and the sealing units simultaneously, telescopically, extend around the ends of the tube. The O-rings of the sealing units are capable of maintaining a seal for the approximately 3500 p.s.i. to be exerted within the tube. As O-rings extend and engage and seal ends of the tube, a closed volume is formed by the tube and bores except for vent ports (not shown). The interior of the tube is purged to minimize the amount of air bubbles trapped therein. A pressure of 900 p.s.i. is maintained in the interior of the tube while the tools of the sealing units 304 are further extended.

The punch 302 then quickly rams down to a tube trapping position. At this position, downwardly projecting section of ledge 330 is just above the tube. Also, downwardly extending die engaging wall 326 has telescopically surrounded the tube and a portion of the die 300. At this point, the bottom edge of the die engaging wall 326 has passed below the radiused edge of the ledge 322 at its lowest point. If the tube was not completely vertically aligned with the ledge 322, die engaging wall 326 of punch 302 will cam the tube inwardly to its proper vertically aligned position. The tube is now completely trapped within a stuffing ledge cavity defined by ledges 322 and 330 and vertical walls 326 and 332 and the tube and bores of the sealing units are entirely filled with the solution of the bath. After the punch 302 has been lowered to its fully engaged position, the pressure inside the tube is increased to 3500 p.s.i.

With the sealing units 304 fully engaged, the internal hydraulic pressure of tube roughly at the less-than-yield pressure, and the punch dwelling at the tube trapping position, the punch 302 rams down to its fully extended position (shown in FIG. 18). With the tube completely trapped within the stuffing ledge cavity defined by ledges 322 and 330 and vertical walls 326 and 332, as ledges 322 and 330 approach each other, tube has nowhere to escape or to be pinched. Instead, the tube merely conforms to the shrinking, contoured cavity which will, upon complete extension of the punch 302, be defined entirely by ledges 322 and 330. The flexible mandrel created by the internal hydraulic pressure within the tube ensures substantially uniform, non-buckling deformation of the tube according to the shape of the ledges 322 and 330.

The internal pressure applied to the tube is increased from preferably about 850 psi to about 3500 psi so that the tube will fill in the corners of the die cavity thus changing the cross-section of the tube from substantially circular to substantially rectangular. The circumference of each rectangular cross-section is the same as or slightly less than the circumference of the tube placed in the die cavity. If desired, the tube can be expanded as large as needed and preferably from about 8–25% of the original size of the blank. The limits of expansion are determined by the material used and the final desired shape.

After completion, appropriate valve means (not shown) vent the remaining pressure in the tube to the bath. After the pressure inside the tube has been reduced, the tools are then retracted and the punch is rammed up to its retracted position. The shuttle then translates from its idle position where the lift mechanism rests midway between station IV and V to its rearward position where the lift mechanism is positioned over station V. Lift mechanism then rams down, clamps partially formed frame member and rams up, lifting it out of the tub. The shuttle then translates to its forward position where the lift mechanism is positioned over station VI.

STATION VI

FIG. 19 illustrates a plan view of station VI. The tooling of station VI is used to pierce holes into the frame member formed by station V. Station VI generally includes a tub 400 formed by a base 402 and walls 404. Mounted to the base of the tub is a riser 406 (see FIG. 20) on which are mounted a post 408 and a slide 410. The post 408 is fixedly mounted by conventional means such as bolts or screws (not shown). The slide 410 is mounted on a track 412 (see FIG. 21) which allows it to travel towards or away from the post 408 as will be described in detail hereinafter. Mounted to and extending through the tub walls 404 are cylinder units 416 located at opposite ends of the tub 400. Cylinders 416 are used to engage the sealing units 418 with the ends 416 of the tube. The sealing units 418 are identical to the sealing units of station V. Cylinders 414 are mounted to and extend through one tub wall 404 and are used to translate the slide 410 towards and away from the post 408 as will be described in detail hereinafter.

With reference to FIG. 19, mounted at various locations on the post 408 and slide 410 are piercing units 420. While a certain number of piercing units 420 have been illustrated at particular positions along the post 408 and slide 410, the number and location of piercing units may vary depending on the number and location of holes to be pierced in the frame member.

Figure 20:
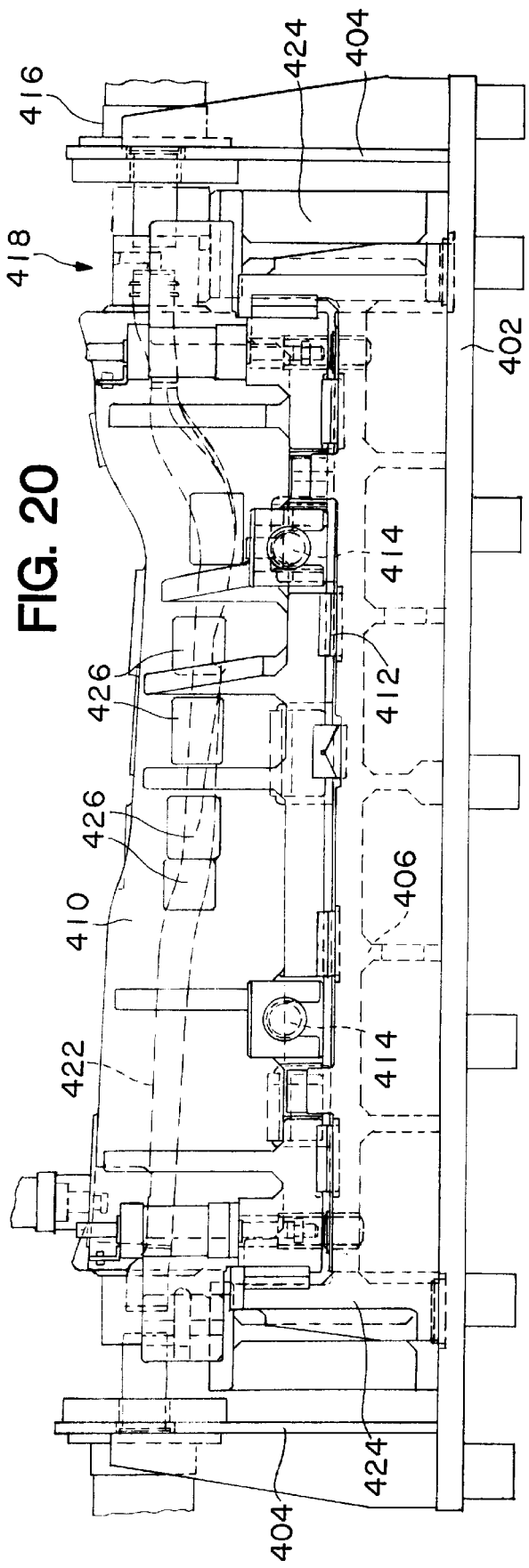
FIG. 20 is a cross-sectional view of Station VI taken along lines 20—20 of FIG. 19.

The slide 410 and post 408 have defined therein a die cavity identical to that of station V as can be seen from dashed lines 422 in FIGS. 19 and 20. The die cavity of station VI does not change the configuration of the tube formed by station V but merely encapsulates the tube while it is being pierced. The tube formed by station V therefore fits neatly within the die cavity formed by the post and slide of station VI.

FIG. 20 is a partial cross-sectional view of station VI taken along lines 20—20 of FIG. 19 with the piercing units 420 removed. The shape of the tube placed in the slide 410 and post 408 is illustrated by dashed lines 422. Each sealing unit 418 is mounted on a riser 424 in the same manner as the sealing units of stations III–V. The cylinder units 414 mounted on one wall 404 of the tub 400 are used to translate the slide 410 towards or away from the post 408. The piercing units 420 (shown in FIG. 19) have been removed to illustrate openings 426 formed along the slide 410. The openings 426 extend through the slide wall to the interior of the die cavity which allow the piercing units to be mounted therein. Similar openings are also provided along the post 408 (not shown). The tub 400 is filled with the same liquid used in the tubs of the other stations as described above. The level of the liquid in the tub is such that the apparatus located in the tub is substantially submerged.

FIG. 21 is a cross-sectional view of station VI taken along line 21—21 of FIG. 19. The slide 410 is illustrated in its engaged position with the post 408. Wear plates 430 are provided on both the slide 410 and post 408 to reduce the wear on the slide and post as is well known to those skilled in the art. As can be seen from the cross-section of the die cavity, the die cavity has substantially the same shape as the tube placed therein.

Two piercing units 420 have been mounted in openings 426 shown in FIG. 20 provided in the slide 410. The piercing units 420 are located such that two holes will be pierced in adjacent sides of the tube.

Each piercing unit 420 generally includes a cylinder 434 and a punch 436. The cylinder 434 translates the punch 436 between its retracted position and its piercing position. Placed inside the opening 426 in the slide 410 is a block 438 with a bore running therethrough. There may, however, be several bores extending through the block as will be discussed with reference to FIG. 28. As previously described, the opening 426 shown in FIG. 20 extends through to the interior of the die cavity. The bore in the block 438 also extends through to the interior of the die cavity and thus exposes a portion of the exterior surface of the tube placed in the cavity. The block 438 is mounted in the opening 426 by conventional means. The bore in the block 438 is dimensioned to allow the punch 436 to pass therethrough as shown in FIG. 21. In particular, the diameter of the bore and the punch 436 are very close so that when the punch 436 is engaged in the bore, the bore is substantially sealed. A chamfer 441 is provided to correct any misalignment between the punch 436 and the bore.

FIG. 22 illustrates a preferred embodiment of a punch 436 used in conjunction with the present invention. The punch 436 has a tube wall engaging section 438 which is generally elliptical in shape as shown in FIG. 23 and is formed from hardened steel. At one end of the section 438 is a piercing surface 440 which is the portion of the punch that pierces or cuts through the wall of the tube. The configuration of the piercing surface 440 of the punch 436 is specially designed to neatly pierce the tubular wall. In particular, the punch is designed with a specific amount of shear relief and point angle which reduces the amount of piercing force needed and reduces surface deformation of the tube wall around the pierced hole. The design of the punch also provides balanced load pressures across the punch face and allows complete slug detachment from the tube wall.

With reference to FIG. 22, the piercing surface 440 is generally a concave surface. The displacement $d_1$ from an edge of the surface to point $p_1$ is preferably about 0.38 inches. While the piercing surface 440 is generally concave, the edge portions of the surface have a linear segment as shown in detail in FIG. 25. With reference to FIG. 25, the linear segment forms an angle $\alpha_1$ with respect to the horizontal. Preferably, the angle $\alpha_1$, is about 70°. The length of the linear segment $d_2$ is preferably 0.03 inches. The shape of the punch face and in particular the edges of the face as shown in FIG. 25 provides a knife edge where the force applied to the tube wall is localized instead of applied across the whole surface as in a conventional punch. In addition, as the knife edge of the punch cuts a slug out of the tube wall, the slug gets pushed into the concave section of the punch face 440. This helps to reduce the force exerted on the tube wall around the edges of the hole being formed. While a particular sized punch has been illustrated in FIGS. 22–25, various other sized punches may be used to punch different sized holes in a tube. While the size of the punch may vary, the design of the punch face must provide the specific amount of shear relief and point angle so that a hole is neatly pierced in the tubular wall.

Figure 22A:
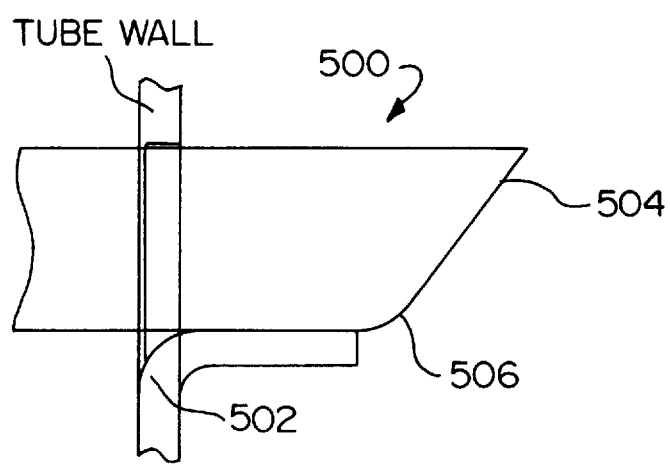
FIG. 22A illustrates another embodiment of a piercing punch.

FIG. 22A illustrates another embodiment of a piercing punch 500 which can be used to pierce holes in the tube wall. The punch 500 has a pointed or angled surface 504 which leads to a radiused edge 506. The punch 500 is shown in its piercing position with the punch 500 extending through the tube wall.

While the punch of FIG. 22 completely removed a slug from the tube wall, the punch of FIG. 22A does not. Instead, punch 500 leaves a portion of the tube wall, a tab 502, uncut. As the punch 500 strikes the tube wall, the radiused edge 506 does not cut through the tube wall but rather forms a tab 502. As the punch enters the interior of the tube, the cut portion of the tube is bent back into the interior of the tube as shown in FIG. 22A. Unlike the punch of FIG. 22 there are no slugs to remove from the interior of the tube pierced by the punch of FIG. 22A. In addition, less force is needed to partially cut the tube wall than that needed to remove a slug from the tube wall.

Figure 26:
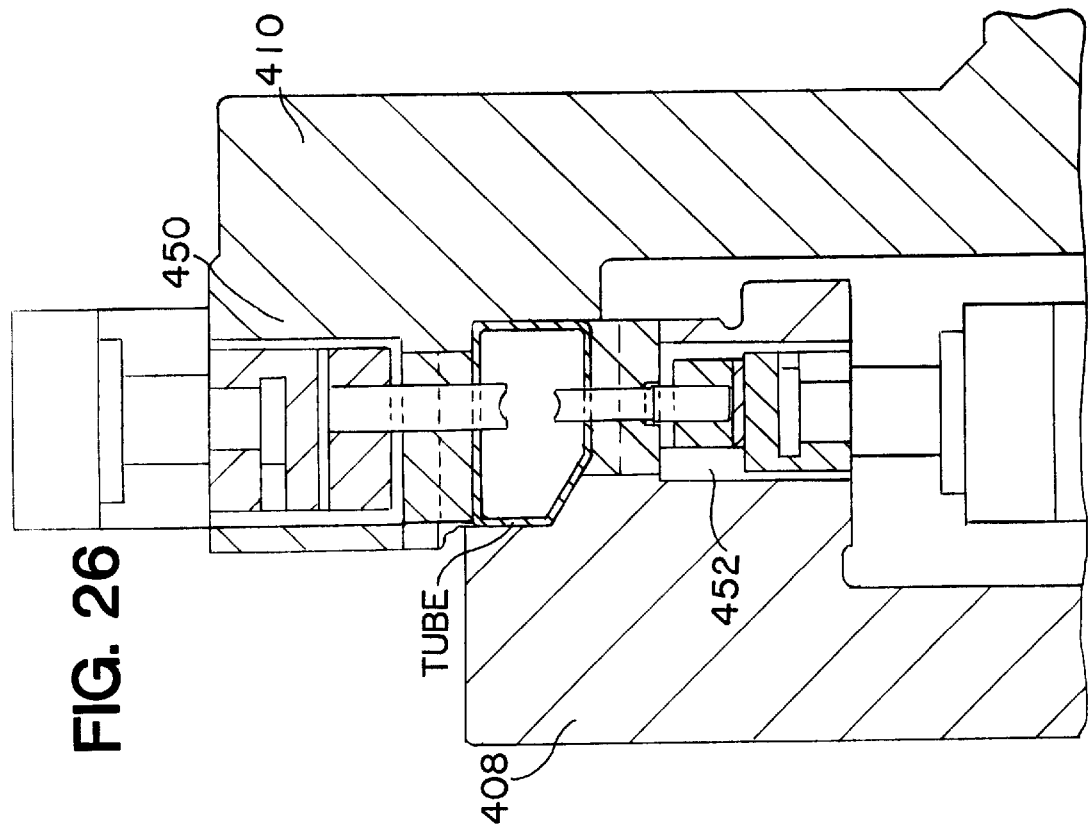
FIG. 26 is a cross-sectional view of Station VI taken along lines 26—26 of FIG. 19.

FIG. 26 illustrates a cross-sectional view of station VI taken along lines 26—26 of FIG. 19. At this section of the frame member, a hole is pierced in the top and bottom of the tube. As previously described, piercing units may be mounted in both the slide and the post. As illustrated in FIG. 26, piercing unit 450 is mounted in the slide 410 while unit 452 is mounted in the post 408. As previously described, the size of the punch may vary as can be seen in FIG. 26 with the punch of the unit 450 mounted in the slide 410 creating a larger hole than the punch of the unit 452 mounted in the post 408.

FIG. 27 illustrates another section of station VI taken along lines 27—27 of FIG. 19. At this section of the frame member only one hole is pierced in the side of the member.

Figure 28:
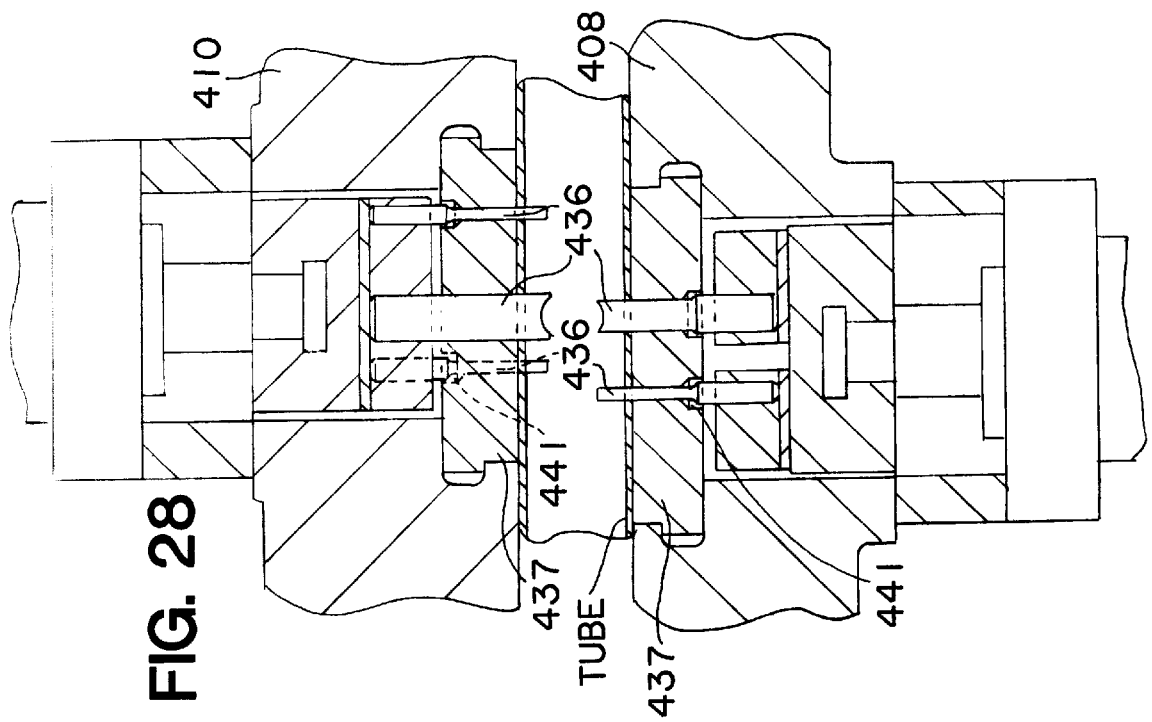
FIG. 28 is a cross-sectional view of Station VI taken along lines 28—28 of FIG. 19.

FIG. 28 illustrates a section of the apparatus taken along lines 28—28 of FIG. 19. As shown in FIG. 19, each piercing unit may include several punches. In FIG. 28 three holes of varying size are pierced in the top of the tube while two holes of varying size are pierced in the bottom of the tube. The block 437 associated with each piercing unit has an appropriate number of bores extending therethrough, correctly dimensioned, to accommodate the number and size of the punches used with a particular piercing unit.

FIG. 29 illustrates another type of punch that is used to form a shape rather than pierce a hole in the tube. The punch 460 has a substantially flat face 462 with recessed edges 464. FIG. 30 illustrates a section of the apparatus taken along lines 30—30 of FIG. 19. At this section of the frame member the punch of FIG. 29 replaces the piercing punch used in other piercing units described earlier. The unit is identical to that of the piercing units described earlier except that the punch of FIG. 29 replaces the piercing punch of either FIGS. 22 or 22A. The punch 460 is used to deform a portion of the frame member as shown in FIG. 30. In particular, the punch 460 is used to form an emboss in the surface of the tube instead of piercing a hole. The punch of FIG. 29 is attached to a cylinder unit in the same way as the piercing punches described earlier and thus need not be described in detail. Various other shapes can be formed in the tube wall using the principles of the present invention as will be appreciated by those skilled in the art.

The operation of station VI will now be described with reference to FIGS. 19–21. With the slide 410 in its retracted position, the tube formed in station V is transferred to the tub of station VI where it is placed in the die cavity of the post 408. As described with reference to the previous stations, the apparatus of station VI is submerged so that when the tube is placed in the die cavity of the post 408, its interior is filled with the liquid. The sealing units 418 engage the ends of the tube and the interior of the tube is purged of air bubbles which may be trapped therein as described above. After the tube is purged, the sealing units 418 pressurize the interior of the tube preferably to about 900 p.s.i. The internal pressure of the tube is monitored and regulated by conventional means such as an external pressure pump and related electro-mechanical devices as is well known to those skilled in the art. It is important to keep the internal pressure of the tube below a pressure which would cause the tube to expand.

Cylinders 414 are then activated to translate the slide 410 to its engaged position thereby closing the die cavity. Once the die cavity is closed, the internal pressure within the tube is increased to preferably about 3,400 p.s.i. Next the piercing units 420 are activated to pierce through the tube at various locations. The piercing is accomplished by translating the punch of the piercing units at a very high velocity preferably a minimum velocity of about 1,350 inches per second. As the punch enters the tube, the hole created by the punch is sealed by the punch with no discernable loss of fluid or pressure. The fluid in the interior of the tube acts as a support for the surface of the tube being pierced and allows a hole to be neatly pierced or cut into the tube. The holes may be simultaneously pierced or sequentially pierced. The deformation punch 460 of FIGS. 29 and 30, however, is not activated until after the holes have been pierced.

After the piercing operation has been performed, the internal pressure of the tube is removed and the punches of the piercing units are retracted. The slide 410 is then retracted thereby opening the die cavity. The pierced tube is removed from station VI and delivered to other stations where the ends are cropped, the slugs are flushed from the interior of the tube and the tube is unloaded as described in U.S. Ser. No. 07/837,081 incorporated herein by reference. Additional holes may be pierced in the ends of the frame member after the end cropping station.

While the present invention has been illustrated with respect to a particular frame member, frame members having other dimensions and shapes may be formed according to the teachings of the present invention. In addition, the ability to form frame members from materials such as steel according to the present invention allows these frame members to be used in space frames for automobiles and trucks for example. While space frames constructed of components formed by aluminum extrusions are known, aluminum extrusions are limited to a constant cross-section and therefore a constant structural strength throughout the length of the extrusion. The present invention can take a tubular blank and expand it in desired areas preferably by as much as 50%. This expansion of the tubular member results in increased yield strength levels due to cold working. Therefore the structural strength and the cross-section of the tubular member may be varied to meet the exact loading conditions throughout the tube.

In addition, constructing a space frame from tubes formed according to the present invention eliminates the need for nested "C" sections used on traditional stamped steel frame sections. The resulting weight savings and elimination of expensive MIG welding with its associated heat induced warping results in a lighter more dimensioning consistent member. Using the technology of thin wall casting as described in particular in U.S. Pat. Nos. 5,069,271 and 4,651,799 and also in U.S. Pat. Nos. 5,113,924; 5,042,561; 4,961,455; 4,606,396; 4,589,466; 4,532,976; 4,508,157; 4,340,108; 4,112,997; 3,900,064 and 3,863,706, all of which are incorporated herein by reference, to form complex high strength and formable joints solves problems associated with traditional steel space frames. Conventional frame designs use stamped sections that are spot welded to other sections at the frame joints. These welds and the joint designs are not rigid and allow movement under loading conditions. This movement reduces the allowable design loads. Furthermore, the joints are areas of high loading and stress. The thin wall casting allows more rigid joints with increased allowable loads due to the higher yield strength material used. Therefore, the ability to vary the cross-section of frame members and the use of thin wall casting technology offers significant weight savings. Specifically a space frame for a midsize car formed by tubes formed according to the present invention connected by joints using thin wall casting technology reduces the weight of the space frame by approximately 20–40% or more as compared to a traditionally formed stamped steel space frame connected by lapped joints.

While the invention has been shown and described in connection with particular preferred embodiments, it is apparent that certain charges and modifications, in addition to those mentioned above, may be made by those who are skilled in the art without departing from the basic features of the present invention. Accordingly, it is the intention of the Applicants to protect all variations and modifications within the true spirit and valid scope of the invention.

What is claimed is:

1. A method of forming in a series of die cavities a frame member having an interior, an elevational view configuration and a cross-sectional view configuration from a tubular blank material having opposed ends, a blank wall and a blank interior comprising the steps of:

expanding a portion of the blank in a first die cavity to form a bulged tube comprising the steps of:
   a) placing the blank in the first die cavity;
   b) applying internal pressure within the blank interior to stabilize the blank wall; and
   c) applying external pressure to the opposed ends of the blank to allow material to flow into the first die cavity to form the bulged tube;

bending the bulged tube in a second die cavity in a first plane to form a preformed tube comprising the steps of:
   a) placing the bulged tube in the die cavity;
   b) pressurizing the bulged tube in the die cavity; and
   c) bending the bulged tube to form the preformed tube bending the preformed tube in a die cavity in a second plane comprising the steps of:
   a) placing the preformed tube in the die cavity;
   b) pressurizing the preformed tube in the die cavity; and
   c) bending the preformed tube in the die cavity creating the frame member by altering the elevational view configuration and the cross-sectional view configuration of the expanded tube.

2. A method according to claim 1 further including the steps of:

pressurizing the interior of the frame member with hydraulic fluid; and piercing holes in the frame member while the interior of the frame member is pressurized.

3. A method according to claim 1 wherein the step of creating the frame member from a tubular blank material includes:

forming a bend having a first radius of curvature in the expanded tube; and decreasing the radius of curvature of the bend from the first radius of curvature to a second radius of curvature.

4. A method according to claim 3 further including the step of:

controlling the material flow of the expanded tube by gripping the opposed ends of the tube as the bend is being formed.

5. A method of forming in a series of die cavities a frame member having an interior, an elevational view configuration and a cross-sectional view configuration from a tubular blank material having opposed ends, a blank wall and a blank interior comprising the steps of:

expanding a portion of the blank in a first die cavity to form a bulged tube comprising the steps of:
   a) placing the blank in the first die cavity;
   b) applying internal pressure within the blank interior to stabilize the blank wall;
   c) applying external pressure to the opposed ends of the blank to allow material to flow into the first die cavity to form the bulged tube;

bending the bulged tube in a second die cavity in a first plane to form a preformed tube comprising the steps of:
   a) placing the bulged tube in the die cavity;
   b) pressurizing the bulged tube in the die cavity;
   c) gripping the opposed ends of the tube to control the material flow; and d) bending the bulged tube to form the preformed tube
bending the preformed tube in a third die cavity in a second plane comprising the steps of:
   a) placing the preformed tube in the third die cavity;
   b) pressurizing the preformed tube in the third die cavity; and
   c) bending the preformed tube in the third die cavity
creating the frame member by altering the elevational view configuration and the cross-sectional view configuration of the bulged tube.

6. A method of forming a frame member from a tubular blank having opposed ends and an interior comprising the steps of:
   placing the blank in an open first die cavity, said first die cavity defining an expanded tube;
   closing the first die cavity;
   applying hydraulic pressure to the interior of the blank and force to the opposed ends of the blank to cause the blank to expand into the first die cavity and create an expanded tube;
   removing the force and pressure applied to the expanded tube;
   transferring the expanded tube from the first cavity to an open second die cavity, said second die cavity defining the frame member having a varying elevational configuration and a varying cross-sectional configuration;
   closing the second die cavity;
   applying hydraulic pressure above the material yield limit of the expanded tube to the interior of the expanded tube to form the frame member;
   removing the internal pressure; and
   removing the frame member from the second die cavity.

7. A method according to claim 6 wherein the internal pressurization and compressive force are applied to the blank simultaneously.

8. A method according to claim 6 wherein the internal pressure applied to the blank while in the first die cavity is greater than the material yield limit of the blank.

9. A method of forming a frame member from a tubular blank having opposed ends and an interior comprising the steps of:
   placing the blank in an open first die cavity, said first die cavity defining an expanded tube;
   closing the first die cavity;
   applying hydraulic pressure to the interior of the blank and simultaneously applying force to the opposed ends of the blank to place the blank under compression to create an expanded tube;
   removing the force and pressure applied to the expanded tube;
   transferring the expanded tube from the first die cavity to an open second die cavity, said second die cavity defining a bent tube member;
   forming a bent tube by applying hydraulic pressure below the yield limit of the expanded tube to the interior of the expanded tube as the second die cavity is closed around the expanded tube;
   removing the bent tube from the second die cavity;
   placing the bent tube in a third die cavity, said third die cavity defining the frame member having a varying elevational configuration and varying cross-sectional configuration;
   applying hydraulic pressure above the material yield limit of the expanded tube to the interior of the bent tube to create a frame member;
   removing the internal pressure; and
   removing the frame member from the third die cavity.

10. A method according to claim 9 further including the step of:
   placing the bent tube in an open fourth die cavity after the blank has been expanded wherein the fourth die cavity defines a bent tube having a smaller radius of curvature than the bent tube defined by the second die cavity;
   applying hydraulic pressure to the bent tube as the fourth die cavity is closed around the bent tube;
   removing the bent tube from the fourth die cavity and transferring it to the third die cavity.

11. An apparatus for forming a frame member from a tubular blank having opposed ends comprising:
   a first station having means for expanding the blank into a bulged tube having a desired cross-section;
   a second station having a mutually cooperating punch and die for applying an internal hydraulic pressure to the expanded tube and compressing the internally pressurized expanded tube between the punch and die to form a preformed tube having a desired plan view configuration;
   a third station having a mutually cooperating punch and die for applying internal hydraulic pressure to the bent tube and compressing the internally pressurized tube between the punch and the die to form a frame member having a desired elevational view configuration and a desired varying cross-sectional configuration.

12. An apparatus according to claim 11 wherein the second station includes a second mutually cooperating punch and die and means for applying an internal hydraulic pressure to the preformed tube and compressing the preformed tube between the second punch and die to form a bent tube having a desired plan view configuration.

13. An apparatus for forming a frame member from a tubular blank having opposed ends and an interior comprising:
   a first station providing a first die cavity with a center, a pair of seals at each end of the first die cavity, the seals being capable of delivering hydraulic fluid to the interior of the blank, means for translating the pair of seals towards the center of the die cavity wherein the blank is placed in the first die cavity, the blank being greater in length than the die cavity so that the pair of seals are then translated toward the die cavity so that they engage the opposed ends of the blank and hydraulic fluid is then delivered to the interior of the tube thereby pressurizing the interior of the blank, the seals continuing to translate towards the center of the die cavity thereby placing the blank under compression;
   a second station providing a mutually cooperating punch and die, a pair of seals at each end of the punch and die, the seals being capable of delivering hydraulic fluid wherein the tube from the first station is delivered to the second station and the interior or the tube is pressurized by engaging the seals with the ends of the tube and delivering hydraulic fluid to the interior of the tube while the tube is being compressed between the punch and die to create a bent tube; and a third station providing a mutually cooperating punch and die, a pair of seals at each end of the punch and die, the seals being capable of delivering hydraulic fluid wherein the tube from the second station is delivered to the third station and the interior of the tube is pressurized by engaging the seals with the ends of the tube and delivering hydraulic fluid to the interior of the tube while the tube is compressed between the punch and die to form a frame member having the desired elevational view configuration and the desired varying cross-sectional view configuration.

14. An apparatus according to claim 13 further including a shuttle transfer system for transferring the tube between stations.

15. An apparatus according to claim 13 further including:

a fourth station providing piercing units and means for pressurizing the interior of the frame member delivered from the third station wherein the tube is first pressurized before the piercing units pierce holes in the tube.

16. An apparatus according to claim 13 further including a gripper mounted in each sealing unit of the second station, the gripper having at least one bead located thereon where the end of the tube is placed over the bead of the gripper wherein a plunger operable with the sealing unit engages the bead with the tube to control the flow of material of the tube into the punch and die of the second station.

* * * * *